(12) United States Patent
Beale et al.

(10) Patent No.: US 12,407,458 B2
(45) Date of Patent: Sep. 2, 2025

(54) COMMUNICATIONS DEVICES, NETWORK INFRASTRUCTURE EQUIPMENT, WIRELESS COMMUNICATIONS NETWORKS AND METHODS

(71) Applicant: Sony Group Corporation, Tokyo (JP)

(72) Inventors: Martin Warwick Beale, Basingstoke (GB); Kazuyuki Shimezawa, Basingstoke (GB); Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 388 days.

(21) Appl. No.: 18/018,597

(22) PCT Filed: Aug. 5, 2021

(86) PCT No.: PCT/EP2021/071942
§ 371 (c)(1),
(2) Date: Jan. 30, 2023

(87) PCT Pub. No.: WO2022/029266
PCT Pub. Date: Feb. 10, 2022

(65) Prior Publication Data
US 2024/0048303 A1 Feb. 8, 2024

(30) Foreign Application Priority Data

Aug. 6, 2020 (EP) .................................... 20189949

(51) Int. Cl.
*H04L 5/00* (2006.01)
(52) U.S. Cl.
CPC .......... *H04L 5/0044* (2013.01); *H04L 5/0007* (2013.01)
(58) Field of Classification Search
CPC .... H04L 5/0044; H04L 5/0007; H04L 5/0053
See application file for complete search history.

(56) References Cited

U.S. PATENT DOCUMENTS

2011/0007830 A1  1/2011  Tanaka
2020/0266942 A1*  8/2020  Akkarakaran .... H04W 74/0833
(Continued)

FOREIGN PATENT DOCUMENTS

EP            4192178 A1 *  6/2023  ......... H04B 7/06952
EP            4064783 B1 * 10/2024  .......... H04W 72/044
KR   10-2009-0079145 A1    7/2009

OTHER PUBLICATIONS

International Search Report and Written Opinion mailed on Dec. 23, 2021, received for PCT Application PCT/EP2021/071942, filed on Aug. 5, 2021, 13 pages.
(Continued)

*Primary Examiner* — Jay P Patel
(74) *Attorney, Agent, or Firm* — XSENSUS LLP

(57) ABSTRACT

A method of receiving data at a communications device from a wireless communications network is provided. The method comprises receiving, by a receiver of the communications device, downlink data during an initial access phase of a communications session of the communications device from a wireless access interface provided by the wireless communications network, and receiving, by the receiver of the communications device, other downlink data during a connected phase of the communications session the communications device transmitted to the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase.

16 Claims, 12 Drawing Sheets

(56) References Cited

U.S. PATENT DOCUMENTS

| | | | |
|---|---|---|---|
| 2021/0007065 A1* | 1/2021 | Ko | H04W 56/00 |
| 2021/0274535 A1* | 9/2021 | Yi | H04W 72/0446 |
| 2022/0225216 A1* | 7/2022 | Babaei | H04W 72/23 |
| 2023/0300786 A1* | 9/2023 | Zhang | H04W 72/51 |
| | | | 455/458 |
| 2024/0064806 A1* | 2/2024 | Fu | H04W 72/1268 |

OTHER PUBLICATIONS

Ericsson, "New SID on support of reduced capability NR devices". 3GPP TSG RAN Meeting #86, RP-193238, Dec. 9-12, 2019, 5 pages.
Holma et al., "LTE for UMTS OFDMA and SC-FDMA Based Radio Access", John Wiley & Sons, 2009, 232 pages.
3GPP, "RAN1 Chairman's Notes", 3GPP TSG RAN WG1 Meeting #101-e, e-Meeting, May 25-Jun. 5, 2020, 60 pages.

* cited by examiner

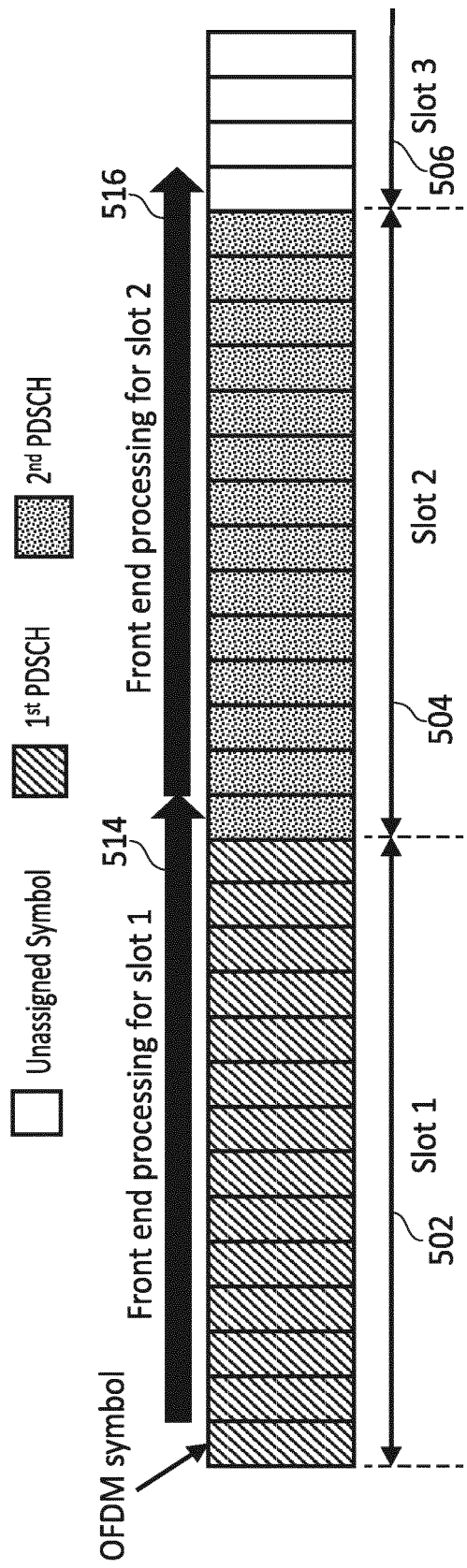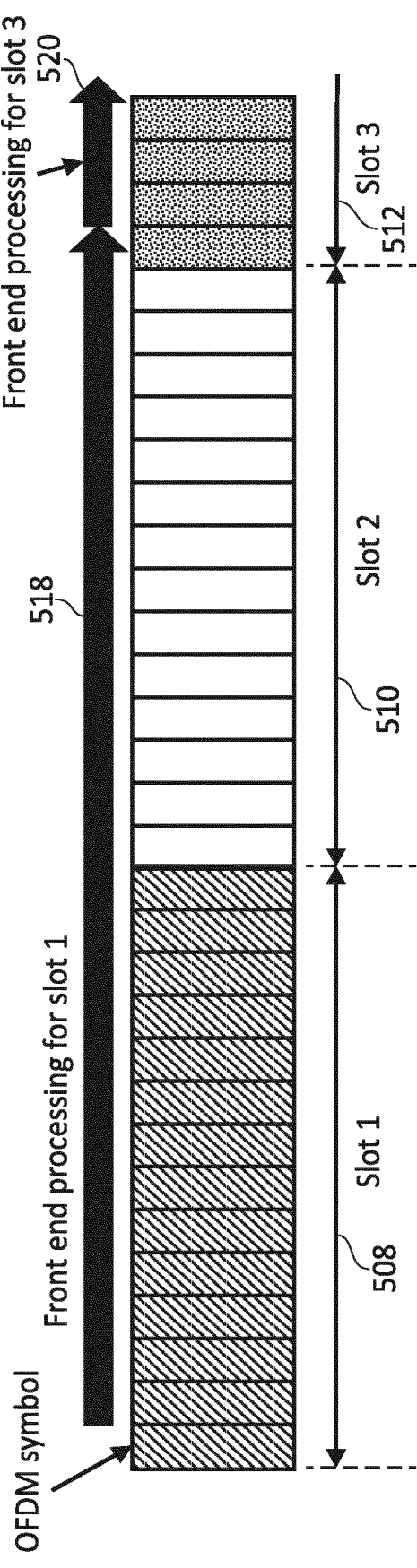
FIG. 6A
FIG. 6B

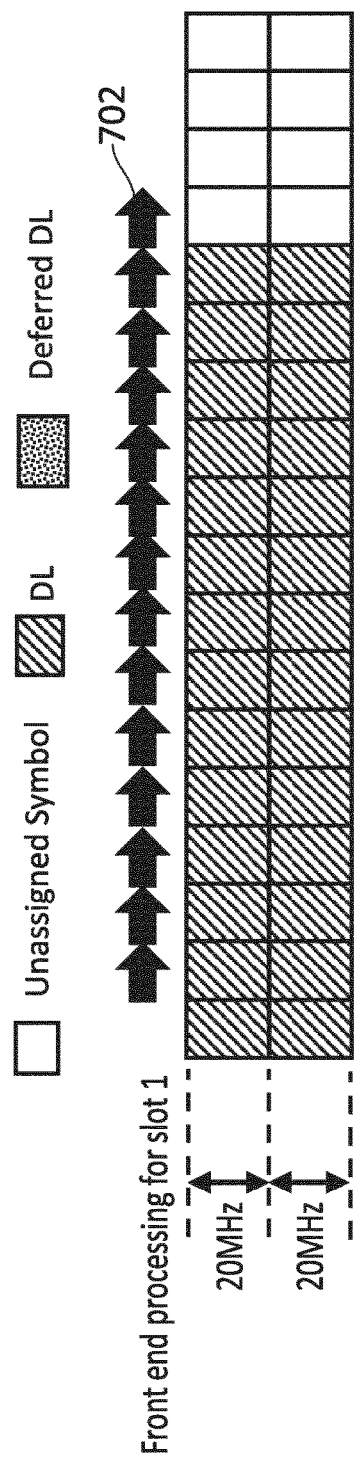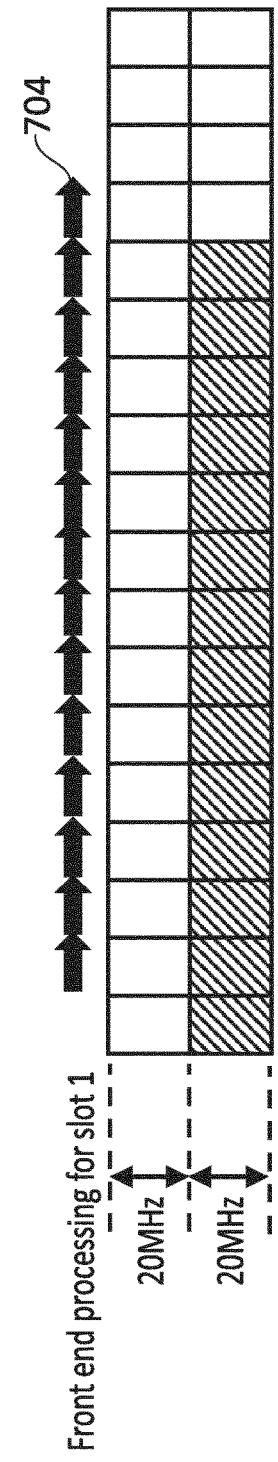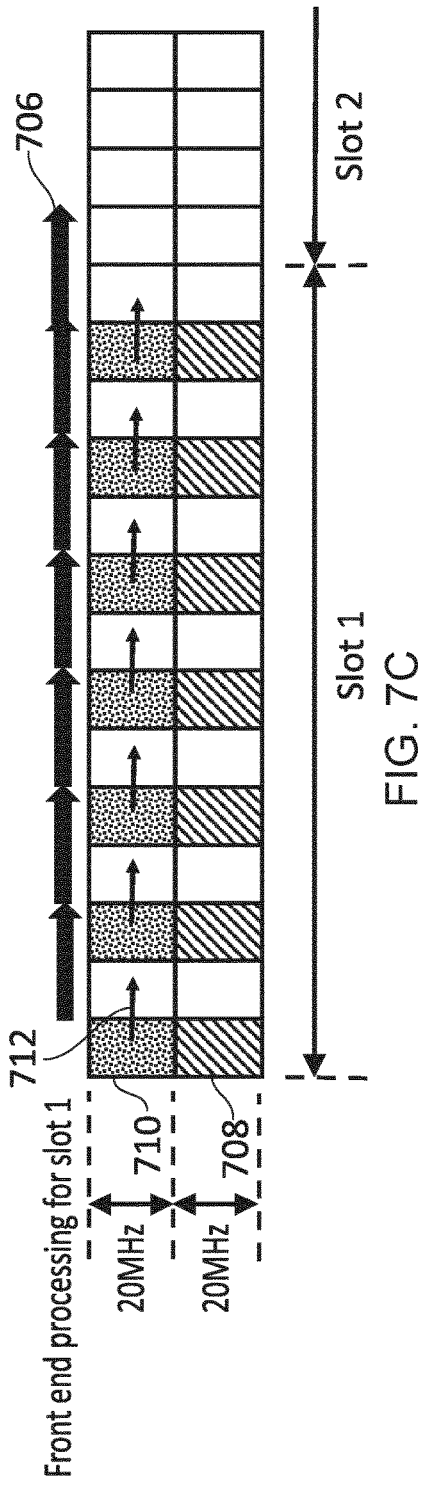
FIG. 7A
FIG. 7B
FIG. 7C

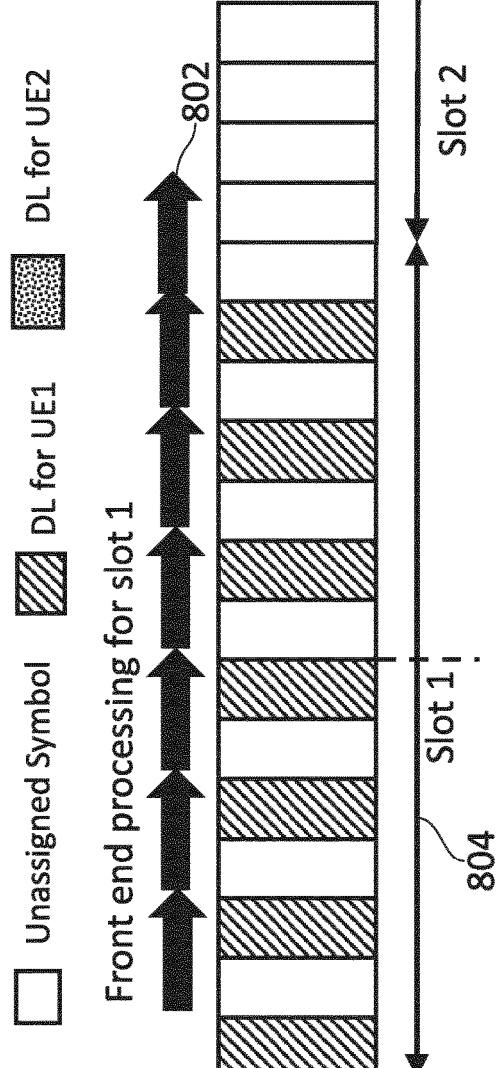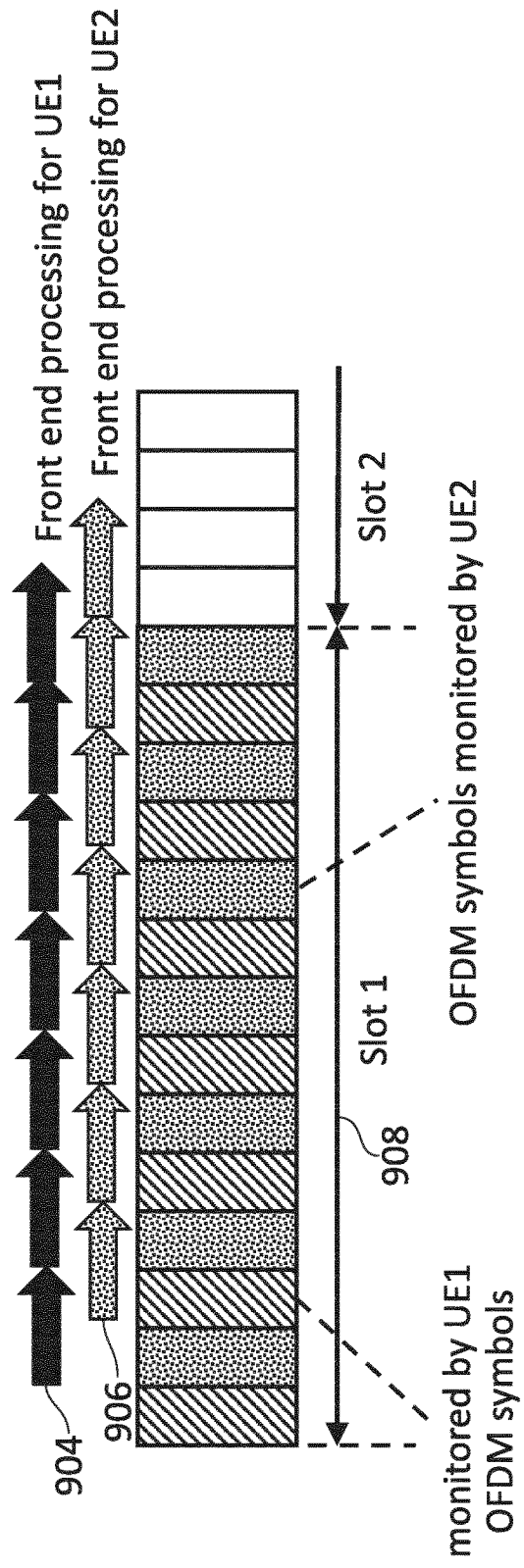
FIG. 8
FIG. 9

COMMUNICATIONS DEVICES, NETWORK INFRASTRUCTURE EQUIPMENT, WIRELESS COMMUNICATIONS NETWORKS AND METHODS

CROSS-REFERENCE TO RELATED APPLICATIONS

The present application is based on PCT filing PCT/EP2021/071942, filed Aug. 5, 2021, which claims priority to European Patent Application No. 20189949.9, filed Aug. 6, 2020, the entire contents of each are incorporated herein by reference.

BACKGROUND

Field

The present disclosure relates to communications devices, network infrastructure equipment, wireless communications networks and methods of receiving data at a communications device. Embodiments can provide improvements in or relating to wireless communications systems operating to communicate data using reduced capability communications devices in which data is received by a communications device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems are able to support a wider range of services than simple voice and messaging services offered by earlier generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to efficiently support communications with an ever-increasing range of devices and data traffic profiles than existing systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmission of relatively small amounts of data with relatively high latency tolerance.

In view of a desire to support new types of devices with a variety of applications there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

The $3^{rd}$ Generation Partnership Project (3GPP) have recently started a study item on reduced capability NR communications devices [1]. The support and configuration of reduced capability NR communications devices represents a technical problem.

SUMMARY

The present disclosure can help address or mitigate at least some of the issues discussed above.

Embodiments of the present technique can provide a method of receiving data at a communications device from a wireless communications network. The method comprises receiving, by a receiver of the communications device, downlink data during an initial access phase of a communications session of the communications device from a wireless access interface provided by the wireless communications network, and receiving, by the receiver of the communications device, other downlink data during a connected phase of the communications session the communications device transmitted to the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the receiving the downlink data during the initial access phase, comprises receiving the downlink data from a reduced number of OFDM symbols per time slot or over a plurality of consecutive time slots and an increased number of the available sub-carriers per OFDM symbol compared to the receiving of the other downlink data during the connected phase, or a reduced number of the available sub-carriers per OFDM symbol of the initial access phase and an increased or the same number of OFDM symbols per time slot or over a plurality of consecutive time slots compared to the receiving of the other downlink data during the connected phase, and the receiving, by the receiver of the communications device, the downlink data during the initial access phase includes processing the downlink data with a maximum rate of processing the downlink data which is less than or equal to a maximum rate of processing the other downlink data received during the connected phase.

Embodiments of the present technique can provide a method of receiving data at a communications device from a wireless communications network. The method comprises receiving, by a receiver of the communications device, downlink data during an initial access phase of a communications session of the communications device from a wireless access interface provided by the wireless communications network, and receiving, by the receiver of the communications device, other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the connected phase having a greater number of sub-carriers available to carry the other downlink data within greater frequency domain physical resources than the OFDM symbols in the initial access phase in which the OFDM symbols have a smaller number of sub-carriers available to carry the downlink data within smaller frequency domain physical resources, wherein the receiving the other downlink data, during the connected phase, comprises receiving the other downlink data from a reduced number of OFDM symbols per time slot or over a plurality of consecutive time slots and an increased number of the available sub-carriers per OFDM symbol compared to the receiving of the downlink data during the initial access phase, or a reduced number of the available sub-carriers per OFDM symbol of the connected phase and an increased or the same number of OFDM symbols per time slot or over a plurality of consecutive time slots compared to the receiving of the downlink data during the initial access phase, and the receiving, by the receiver of the communications device, the other downlink data during the initial access phase includes processing the other downlink data with a maximum rate of processing the other downlink data which is less than or equal to a maximum rate of processing the downlink data received during the initial access phase.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 6A is a schematic frequency against time diagram illustrating a UE processing consecutive slots according to existing art;

FIG. 6B is a schematic frequency against time diagram illustrating a reduced capability UE processing alternative slots according to exemplary embodiments;

FIG. 7A is a schematic frequency against time diagram illustrating a processing procedure for a UE capable of decoding a full 40 MHz system bandwidth in adjacent OFDM symbols;

FIG. 7B is a schematic frequency against time diagram illustrating a processing procedure for a reduced capability UE capable of decoding a 20 MHz bandwidth in adjacent OFDM symbols;

FIG. 7C is a schematic frequency against time diagram illustrating a processing procedure for a reduced capability UE capable of decoding a 20 MHz bandwidth in adjacent OFDM symbols according to exemplary embodiments;

FIG. 8 is a schematic frequency against time diagram illustrating an allocation of resources for a reduced capability UE on alternate OFDM symbols according to exemplary embodiments;

FIG. 9 is a schematic frequency against time diagram illustrating an allocation of resources for two reduced capability UEs on alternate OFDM symbols according to exemplary embodiments;

DETAILED DESCRIPTION OF THE EMBODIMENTS

Long Term Evolution Advanced Radio Access Technology (4G)

Figure 1:
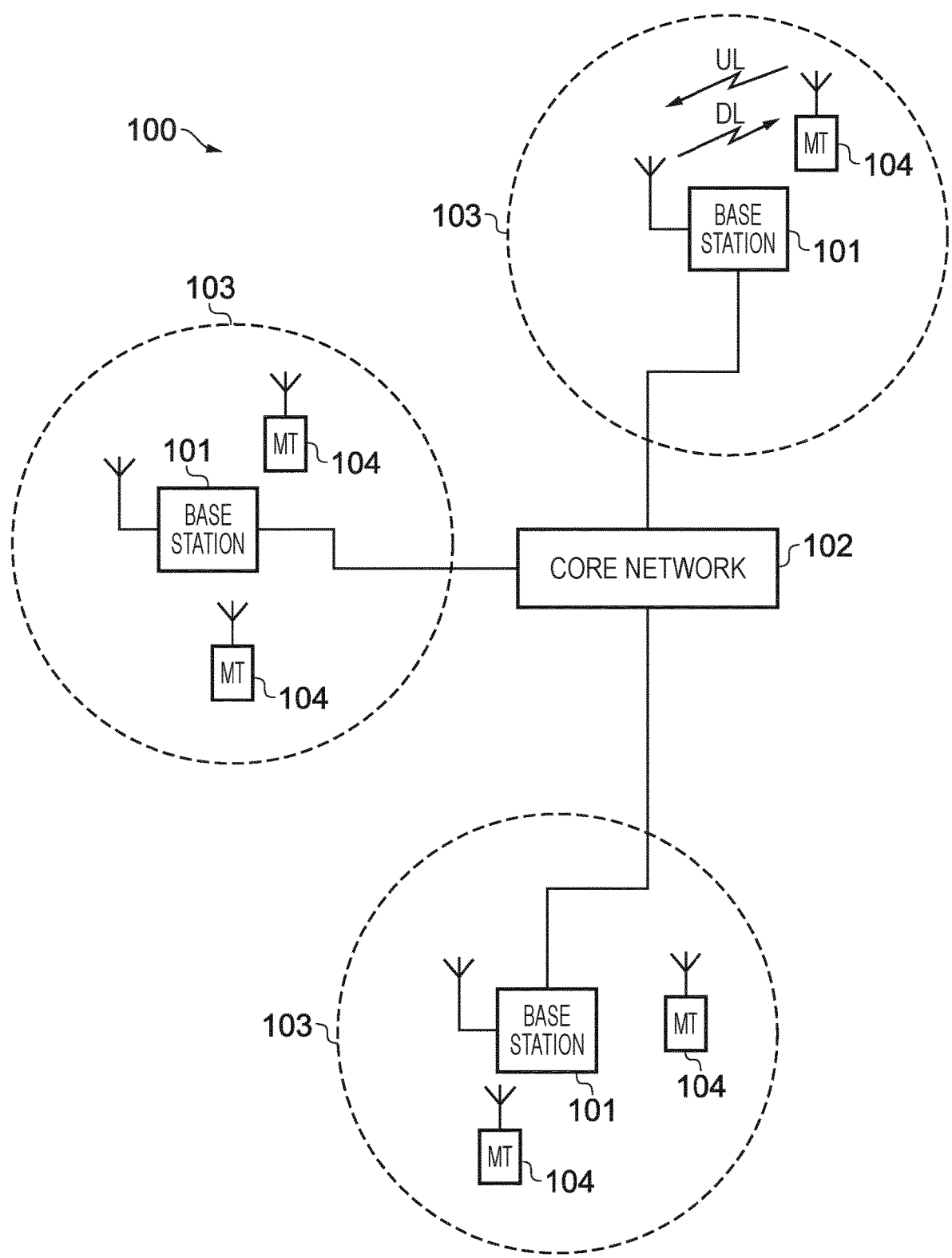
FIG. 1 schematically represents some aspects of an LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
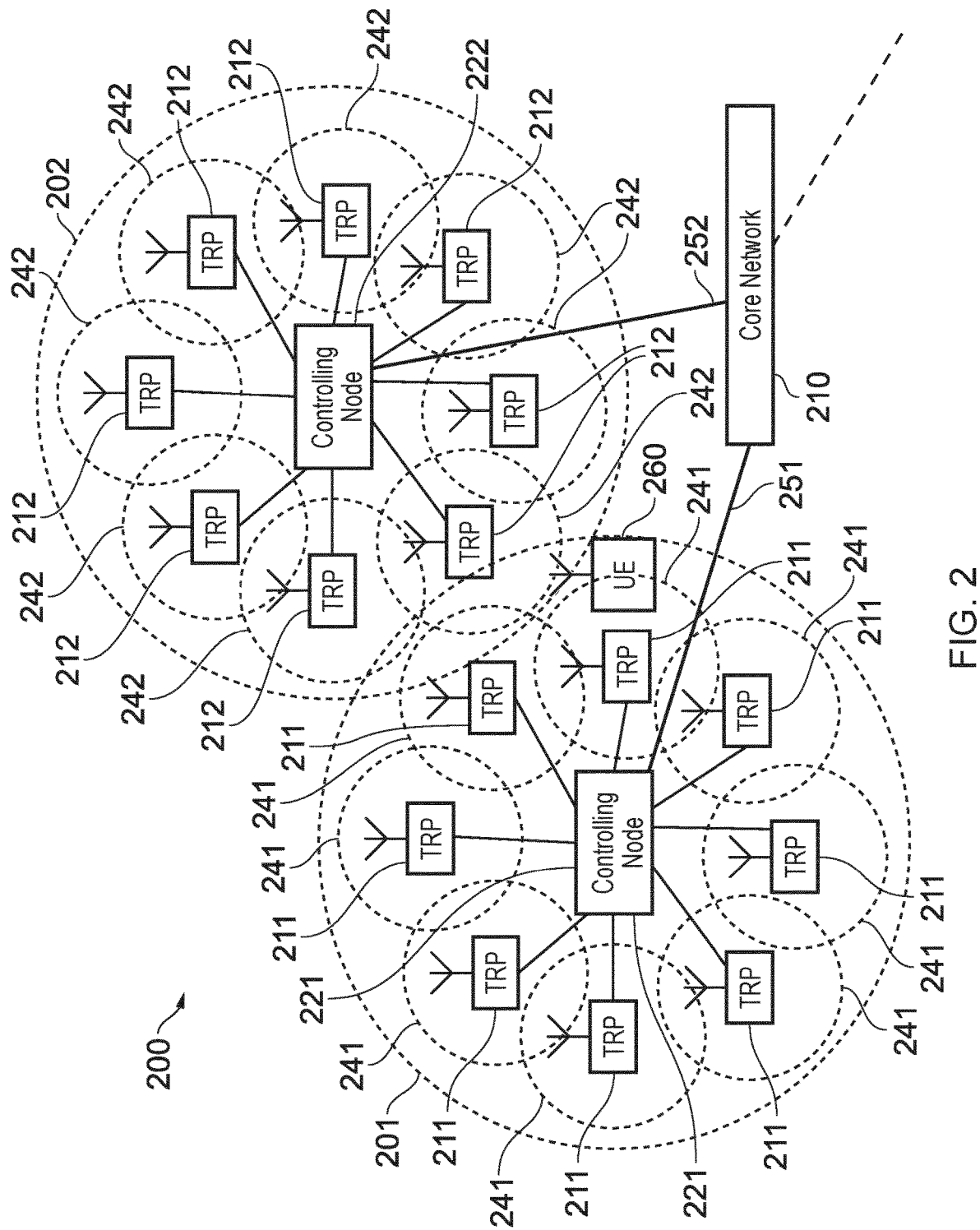
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
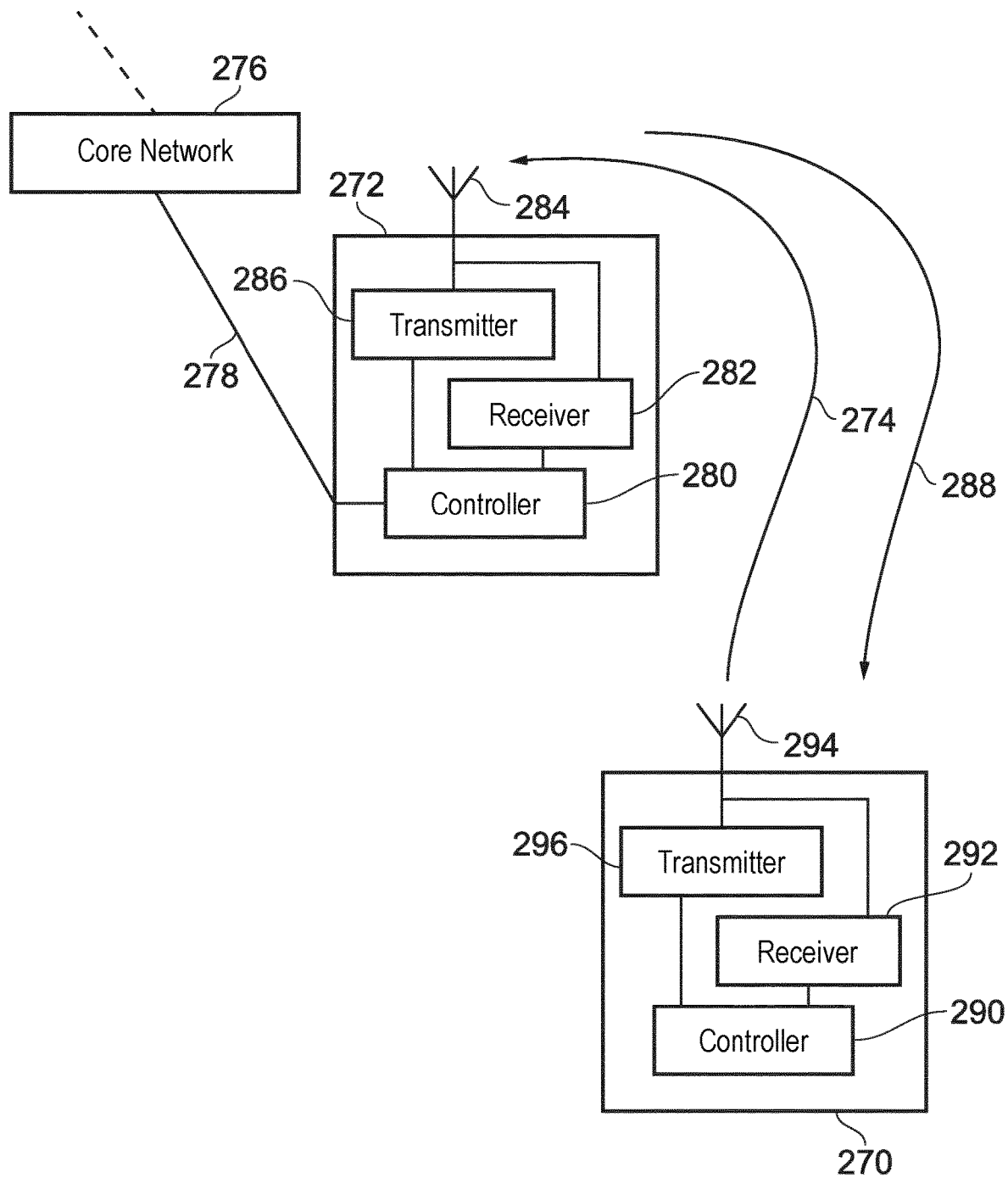
FIG. 3 shows a schematic representation of a telecommunications system in accordance with certain embodiments of the present disclosure.

A more detailed illustration of a UE 270 and an example network infrastructure equipment 272, which may be thought of as a base station 101 or a combination of a controlling node 221 and TRP 211, is presented in FIG. 3. As shown in FIG. 3, the UE 270 is shown to receive downlink data from the infrastructure equipment 272 via resources of a wireless access interface as illustrated generally by an arrow 288. The UE 270 receives the downlink data transmitted by the infrastructure equipment 272 via communications resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements.

The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Example embodiments can provide a method of receiving data at a communications device from a wireless communications network. A receiver of a communications device receives downlink data during an initial access phase of a communications session of the communications device from a wireless access interface provided by the wireless communications network, and receives, other downlink data during a connected phase of the communications session the communications device transmitted to the communications device via the wireless access interface. The wireless access interface provides communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the receiving the downlink data during the initial access phase, comprises receiving the downlink data from a reduced number of OFDM symbols per time slot or over a plurality of consecutive time slots and an increased number of the available sub-carriers per OFDM symbol compared to the receiving of the other downlink data during the connected phase, or a reduced number of the available sub-carriers per OFDM symbol of the initial access phase and an increased or the same number of OFDM symbols per time slot or over a plurality of consecutive time slots compared to the receiving of the other downlink data during the connected phase, and the receiving, by the receiver of the communications device, the downlink data during the initial access phase includes processing the downlink data with a maximum rate of processing the downlink data which is less than or equal to a maximum rate of processing the other downlink data received during the connected phase.

3GPP have recently started a study item on reduced capability NR communications devices [1]. Potential complexity reduction features in NR to be studied by 3GPP include:

Reduced number of UE RX/TX antennas
UE bandwidth reduction
Half Duplex Frequency Division Duplexing (HD-FDD)
Relaxed UE processing time
Relaxed UE processing capability
3GPP have also agreed the following [3]:
For Frequency range 1 (FR1) (410 MHz to 7125 MHz), a maximum UE bandwidth of at least 20 MHz should be studied at least for initial access.
For Frequency range 2 (FR2) (24.25 GHz to 52.6 GHz), a maximum UE bandwidth of 50 MHz and 100 MHz should be studied at least for initial access.

Hence in some examples, while the maximum UE bandwidth is 20 MHz (or more) during the initial access phase for FR1, the UE could operate with a different maximum UE bandwidth when the UE is in other phases of operation.

The "maximum bandwidth" of a UE is used herein to mean a maximum frequency range which the UE can decode in a single OFDM symbol or time slot.

An example of a reduced capability NR communications device is an enhanced Machine Type Communications (e-MTC) User Equipment (UE). Currently an eMTC UE can operate with a reduced bandwidth compared to a system bandwidth and therefore can represent one example of a reduced capability communications device. However, the reduced bandwidth is fixed. For example, a radio frequency bandwidth capability of current eMTC UEs is fixed at 1.4 MHz and a baseband bandwidth capability of current eMTC UEs is fixed at 1.08 MHz.

Because of the reduced bandwidth, current eMTC UEs cannot perform initial access with existing resources of a cell to which the eMTC UE belongs. By contrast, the UE requires specific system information blocks (SIBs) and a new Physical Downlink Control Channel (PDCCH) design in order to perform initial access.

Example embodiments can provide advantages in which a communications device (UE) operates with a different UE bandwidth in a connected phase compared to an initial access phase, or indeed operates more generally with a reduced bandwidth. The reduction in operating bandwidth can be achieved by reducing a data processing rate (operations per second) which a UE is required to perform to receive data or to transmit data. Accordingly, one or both of a capability of a signal processor in the UE's receiver or a power consumed by the UE is reduced as a result of operating at a lower processing rate. Such an arrangement can be more easily appreciated from an example receiver shown in FIG. 4 which may be configured in accordance with example embodiments.

Figure 4:
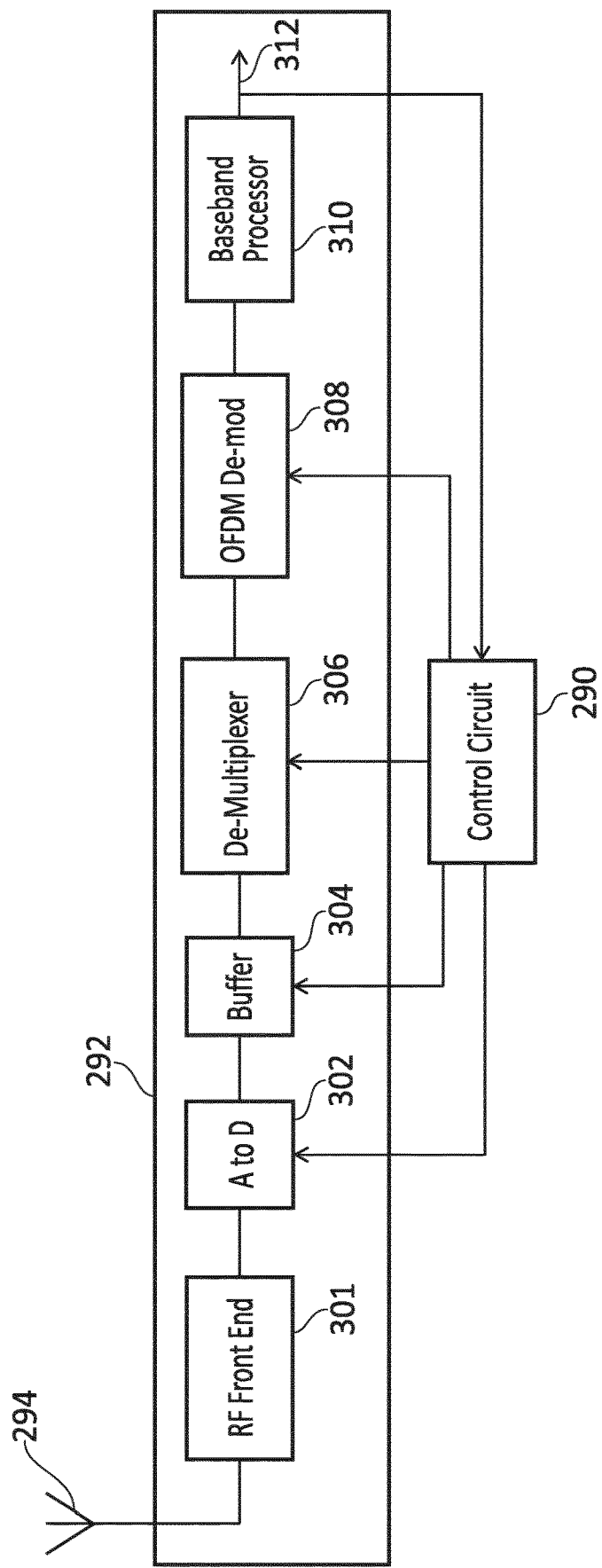
FIG. 4 shows a schematic diagram illustrating a receiver of a communications device in accordance with certain embodiments of the present disclosure.

FIG. 4 is an example block diagram of a receiver 292, such as that shown in the UE 270 of FIG. 3. As shown in FIG. 4 an antenna 294 detects radio frequency signals which are fed to a radio frequency (RF) Front End block 301, which down converts the radio frequency signals received within a system bandwidth of a carrier of a wireless access interface into baseband signals which are output to an analogue to digital (A to D) converter 302. The A to D converter 302 generates digital samples at a sampling rate matching that required for the baseband signals and outputs the digital samples to a receiver buffer 304. The receiver buffer 304 is configured to store a number of the digital samples over a predetermined period of the wireless access interface such as one or more OFDM symbols or one or more time slots as explained below. A control circuit 290 controls the A to D converter 302, the receiver buffer 304 and a de-multiplexer to feed selectively digital samples stored in the receiver buffer 304 recovered from the wireless access interface which have been transmitted to the UE for demodulation and decoding by an OFDM de-modulator 308 and a baseband processor 310. According to the example embodiments data and control information transmitted to the UE 270 from a gNB is modulated and transmitted using one or more OFDM symbols in time slots and comprising a number of sub-carriers in the frequency domain. The de-multiplexer selects one or more of the OFDM symbols carrying data and/or control information transmitted to the UE from the wireless access interface which are fed from the receiver buffer 304 to the ODFM de-modulator 308 and converted from the time to the frequency domain using a forward Fourier transform. The data and/or the control information are then detected by demodulating the respective sub-carriers of the OFDM symbols in the frequency domain. The data and/or control information is decoded using forward error correction decoding and fed to an output channel 312.

As indicated above the control circuitry 290 controls the blocks of the receiver to detect the data and the control information transmitted to the UE via the wireless access interface. The RF front End 301 is controlled to tune to the carrier frequency of the wireless access interface to recover the base band analogue signals which are sampled by the A to D converter. A location of the data and control information is determined from system information and synchronisation signals detected from an initial access phase and fed to the control circuit 290 and used to control the de-multiplexer and OFDM de-modulator to recover other control information and data from the buffered signals.

As will be appreciated a rate at which the blocks of the receiver shown in FIG. 4 must process signals and data will depend on a rate at which the data is transmitted to the UE during both an initial access phase and a connected phase via the wireless access interface. Therefore generally a baseband processing rate (operations per second) of the receiver blocks 302, 304, 306, 308, 310 will be determined by a number of OFDM symbols per time slot and a number of sub-carriers per OFDM symbol. As will be explained in the following paragraphs, example embodiments can provide reduced capability UEs which can perform initial access using existing resources of the cell to which the UE belongs in contrast to existing e-MTC UEs. Furthermore, a bandwidth processing capability of reduced capability UEs according to exemplary embodiments can vary between the initial access and connected phases of operation.

Figure 5:
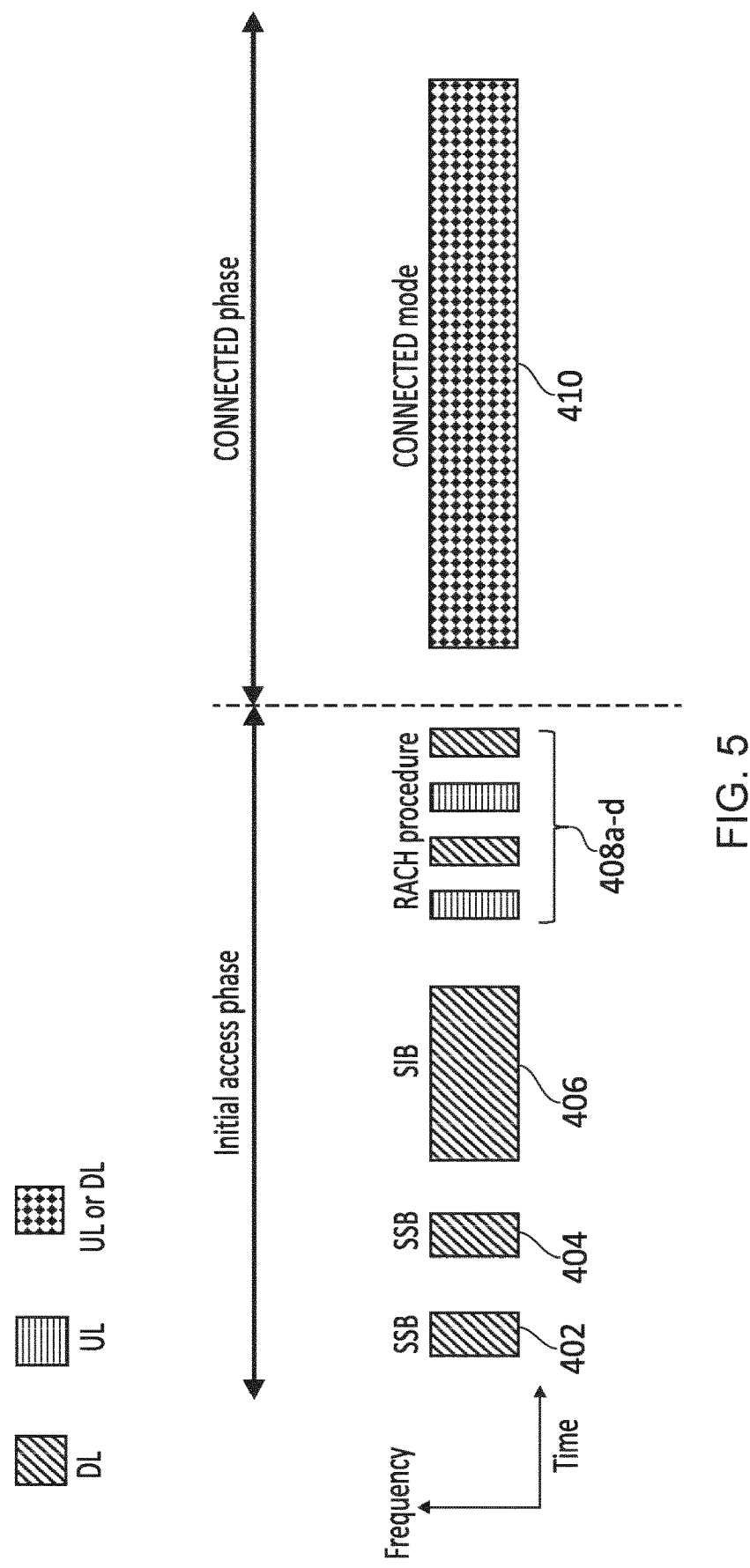
FIG. 5 is a schematic frequency against time diagram illustrating communications involved in both the initial access phase and the connected phase.

In NR communications, a UE operates in an initial access phase to establish a connection to the network. Once the initial access phase has been completed, the UE and network transition to operating in a connected phase, where a Radio Resource Control (RRC) connection exists between the UE and network. In the connected phase, the UE may communicate with the network via unicast signalling. An example of an initial access phase and a connected phase in NR communications is shown in FIG. 5. In particular, FIG. 5 is a schematic frequency against time diagram illustrating communications involved in both the initial access phase and the connected phase.

As shown in FIG. 5, dashed lines represent downlink channels/signals, horizontal lines represent uplink channels/signals and diamonds represent either uplink or downlink channels/signals.

As part of the initial access phase, the UE may receive one or more Synchronisation Signal Blocks (SSBs) 402, 404 from the gNB. Each SSB 402, 404 contains a primary synchronisation signal (PSS), a secondary synchronisation signal (SSS) and a Physical Broadcast Channel (PBCH). After receiving the one or more SSBs 402, 404, the UE decodes the SSBs 402, 404. Decoding the SSBs 402, 404 allows the UE to achieve time and frequency synchronisation with the network by using the synchronisation signals within the SSBs 402, 404. Decoding the SSBs 402, 404 also allows the UE to receive a master information block (MIB) in each of the PBCHs to receive control resources required for decoding System Information Block 1 (SIB 1) (see below). For example, the MIBs may provide information on control resource set (CORESET)#0 resource element number 0. It will be appreciated by one skilled in the art that CORESET#0 is a set of physical resources in 5G/NR which is used to carry a Physical Downlink Control Channel (PDCCH) for SIB1 scheduling.

As part of the initial access phase, the UE may search for and decode the PDCCH within CORESET#0 for scheduling information to receive a Physical Downlink Shared Channel (PDSCH) for SIB1. The PDCCH may contain information on a location of the resources and so on. SIB1 contains radio resource configuration information that is common for all UEs that are served by the gNB (except information applicable to unified access control as will be appreciated by one skilled in the art). SIB1 also defines a scheduling of other system information, such as other system information contained in SIB block 406, for the UE. The SIB block 406 may contain one or more other SIBs (e.g. SIB1 to SIB14) as will be appreciated by one skilled in the art.

As part of the initial access phase, the UE may read the other system information in SIB block 406 based on the information obtained from SIB1. Using the system information, the UE may determine whether a cell of the gNB is a suitable cell for the UE. For example, the UE may determine whether the cell of the gNB is a cell suitable for the UE based on a Public Land Mobile Network Identification (PLMN ID) and/or access class barring flags or the like as will be appreciated by one skilled in the art. In addition, the UE may obtain parameters for a RACH procedure 408a-d from the system information. For example, the system information may include one or more of: Physical Random Access Channel (PRACH) preambles which should be used in the RACH procedure 408a-d, PRACH formats which should be used in the RACH procedure 408a-d, locations of PRACH in time and frequency or the like as will be appreciated by one skilled in the art.

As part of the initial access phase, the UE executes the RACH procedure 408a-d if it determines that the cell of the gNB is a suitable cell for the UE. The RACH procedure 408a-d shown in FIG. 5 is a four-step RACH procedure. It will be appreciated by one skilled in the art that a two step RACH procedure may alternatively be used. As part of the RACH procedure, the UE transmits a PRACH preamble 408a to the gNB. The UE then receives 408b a random access response (RAR) from the gNB. The UE then transmits "Msg3" 408c to the gNB. As will be appreciated by one skilled in the art, Msg 3 contains an RRC message requesting an RRC Connection to the gNB. An RRC Connection Setup message includes UE capability information. The UE then receives Msg 4 408d from the gNB. Msg 4 contains an RRC message confirming establishment of the RRC connection. Msg4 also allows for contention resolution procedures to occur as will be appreciated by one skilled in the art.

As explained above, once the initial access phase has been completed, the UE and network transition to operating in a connected phase, where an RRC connection exists between the UE and network. During the connected phase, the UE enters a connected mode 410 where it may communicate with the network via unicast signalling. In accordance with exemplary embodiments, the UE sends capability information to the gNB which may include an indication of a maximum capability of the UE. Since the gNB knows the bandwidth capability of the UE, the gNB may ensure transmissions to the UE are within the bandwidth capability of the UE.

As part of the connected phase, the UE may need to receive one or more broadcast or multicast messages. For example, in a case in which the system information changes, the UE may receive one or more MIB or SIB messages from the gNB to update the UE on the changed system information. The UE may also receive Group Common Downlink Control Information (GC-DCI) messages in the connected phase. The GC-DCI messages may be sent to a plurality of UEs to indicate one or more of a slot format indication (SFI), an uplink cancellation indication (UL CI) or a downlink pre-emption indicator (DL PI). The SFI may contain information on which OFDM symbols within a slot are uplink and which are downlink. The UL CI may indicate whether one or more scheduled UL transmissions should be cancelled (for example, as a result of higher priority URLLC transmissions taking precedence). The downlink pre-emption indicator may indicate which downlink allocations have been pre-empted to allow for higher priority URLLC transmissions.

As explained above, 3GPP have agreed for FR1 that UEs having a maximum bandwidth of at least 20 MHz for initial access should be studied. For example, it is desirable that UEs in a wireless communications network have a common initial access procedure. However, operation with a maximum 20 MHz bandwidth may not be optimal during the connected phase. For example, it may be advantageous to increase the bandwidth capability in the connected phase to make it easier to schedule reduced capability UEs at the same time as UEs which do not have reduced capability, provide increased frequency diversity, and/or reduce power consumption. A UE which has different bandwidth requirements in the initial access and connected phases may lead to different UE complexity requirements for the initial access and connected phases. In general a higher maximum bandwidth leads to a higher UE complexity and, if the initial access and connected phases have different bandwidth requirements, then the UE complexity is typically limited by the highest maximum bandwidth requirement in either the initial access or connected phase. However, there are situations in which it is desirable to minimise UE complexity. In such situations, the given UE complexity may be fixed. Therefore, minimising UE complexity whilst enabling variable bandwidth requirements in the initial access and connected phases represents a technical problem.

For example, a UE may be configured to operate with a 20 MHz bandwidth during the initial access phase which requires a given UE complexity in respect of a processing rate of components of the receiver. If a bandwidth of above 20 MHz is optimal for the connected phase (for example, a larger bandwidth may lead to a lower power consumption in the connected phase), then a technical problem is how to enable the UE to operate in the connected phase with a bandwidth above 20 MHz without increasing UE complexity.

In another example, a bandwidth of below 20 MHz may be optimal for the connected phase which requires a given UE complexity. However, the UE must still be able to operate with a 20 MHz bandwidth during the initial access phase. In such an example, a technical problem is how to enable the UE to operate in the initial access phase with a bandwidth of 20 MHz (which is greater than the bandwidth required for the connected phase) without increasing UE complexity.

Therefore, in example embodiments, a maximum bandwidth capability of a UE is different between an initial access phase and a connected phase of operation.

In example embodiments, a complexity of the UE is limited by the phase which has a lower maximum bandwidth capability. If the UE was required to decode every slot/OFDM symbol in the phase in which the maximum bandwidth capability is greater, then the UE complexity would increase. Example embodiments avoid or at least reduce an increase in UE complexity because the UE does not decode every slot (or every OFDM symbol). By not decoding every slot or OFDM symbol, the UE can decode wider frequency resources for the same UE complexity, whereby the UE's receiver, during one of the initial access phase or the connected phase when receiving downlink data includes processing the downlink data with a maximum rate of processing the downlink data which is less than or equal to a maximum rate of processing the downlink data received during the other of the initial access phase and the connected phase.

FIGS. 6A and 6B are schematic diagrams illustrating how front end processing requirements, and therefore how UE complexity in respect of a processing rate of receiver components can be reduced by not decoding every slot. The term front end processing is intended to mean and to infer an amount of data processing operations per second. For example, the front end-processing requirements may include processing requirements of the A to D converter 302, the buffer, the de-multiplexer, the OFDM de-modulator and/or the baseband processor 310.

In FIG. 6A, a first Physical Downlink Shared Channel (PDSCH) transmission is scheduled in a first slot 502 and a second PDSCH transmission is scheduled in a second slot 504 from a gNB to a UE. As will be appreciated from FIG. 6A, the front end processing for the first PDSCH occurs over a time corresponding to the length of the first slot 502 as indicated by horizontal arrow 514 and the front end processing for the second PDSCH occurs over a time corresponding to the length of the second slot 504 as indicated by horizontal arrow 516.

FIG. 6B shows how a UE according to example embodiments may reduce front end processing requirements by not decoding every slot. As will be appreciated from FIG. 6B, front end processing for the first PDSCH occurs over the first and second slots 502, 504. In other words, the front end processing for the first PDSCH is extended over a time corresponding to a length of two slots, as indicated horizontal arrow 518, so that a number of operations required per unit time to decode the first PDSCH is reduced compared to the UE in FIG. 6A. By reducing the front end processing requirements, UE complexity can be reduced.

Initial Access Phase Bandwidth is Larger than Connected Phase Bandwidth

According to some example embodiments a UE receives data from a wireless communications network, by receiving downlink data during an initial access phase of a communications session from a wireless access interface provided by the wireless communications network, and by receiving other downlink data during a connected phase of the communications session via the wireless access interface. The wireless access interface provides communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources. The wireless access interface is therefore configured for the UE to receive data in the connected phase and so can operate as a reduced capability device. The downlink data is transmitted, during the initial access phase, in a reduced number of OFDM symbols per time slot or over a plurality of consecutive time slots and an increased number of the available sub-carriers per OFDM symbol compared to the receiving of the other downlink data during the connected phase, or a reduced number of the available sub-carriers per OFDM symbol of the initial access phase and an increased or the same number of OFDM symbols per time slot or over a plurality of consecutive time slots compared to the receiving of the other downlink data during the connected phase.

As a result of an adaptation of the transmission of the downlink data during the initial access phase, the UE can receive the downlink data during the initial access phase by processing the downlink data with a maximum rate of processing which is less than or equal to a maximum rate of processing the other downlink data received during the connected phase. In other words the UE can be configured to operate in the initial access phase using the same processing rate or a lower processing rare than that in the connected phase, which then can be matched to a capability of the UE. As such data can be received in the initial access phase by a reduced capability UE as it can in the connected phase. The processing rate here means the number of operations per second performed by one or more of the receiver blocks 290, 301, 302, 304, 306, 308, 310 shown in FIG. 4.

In example embodiments, a maximum initial access phase bandwidth (greater number of sub-carriers available within greater frequency domain physical resources) is larger than a maximum connected phase bandwidth (the OFDM symbols have a smaller number of sub-carriers available within smaller frequency domain physical resources). In such embodiments, the UE may have complexity such that it can decode in every slot across the maximum bandwidth in the connected phase but not in the initial access phase. In such embodiments, the UE is given sufficient time between uplink or downlink transmissions in the initial access phase such that the UE can decode across the entire bandwidth of the initial access phase without increasing UE complexity. In other words, the UE does not transmit or receive messages in every slot of the initial access phase.

In an example, the maximum initial access phase bandwidth of the UE is 20 MHz and the maximum connected phase bandwidth of the UE is 10 MHz. Allowing the UE to have a 20 MHz UE bandwidth capability during the initial access procedure has the following implications:

The UE and the gNB can communicate during the initial access phase with SSBs and CORESET#0 for SIB1 without any specification changes.

SIB signalling is restricted to operate in a 20 MHz bandwidth. SIBs other than SIB1 are scheduled dynamically by the gNB (using DCI signalling) within a CORESET indicated by SIB1. Therefore, restricting signalling of SIBs other than SIB1 to operation in a 20 MHz bandwidth is an implementation matter for the gNB. In other words, the gNB must schedule SIBs other than SIB1 within a 20 MHz bandwidth in order to support such a UE capability.

Transport blocks containing SIBs are not scheduled in every slot. It will be appreciated by one skilled in the art that an SIB may be segmented across one or more transport blocks. The gaps between transport blocks containing the SIBs allow the UE to extend processing from one slot to an adjacent slot in time. SIB scheduling is an implementation matter, hence the gNB is able to currently schedule transport blocks of SIBs in this manner. In such embodiments, a gNB may schedule transport blocks of SIBs in alternate slots (or at least such that two SIB transport blocks do not occupy adjacent slots in time) so that the UE can decode the transport blocks containing the SIBs.

In example embodiments, the gNB may schedule transport blocks of SIBs for legacy UEs in every slot but may schedule transport blocks for SIBs for reduced capability UEs such that two SIB transport blocks transmissions do not occupy adjacent slots in time.

In example embodiments, a first SIB transport block and a second SIB transport block may be scheduled by a gNB in a first and second PDSCH respectively for a UE such that there is a sufficient time gap between the first and second PDSCH to allow the UE to perform front end and baseband processing of the PDSCH carrying the SIB transport block. It will be appreciated by one skilled in the art that the first SIB transport block and the second SIB transport block are carried by the first and second PDSCH respectively.

For example, the first SIB transport block may be scheduled such that there is a gap of at least one slot between the first SIB transport block and the second SIB transport block.

In other words, the gNB will ensure that PDSCHs carrying SIB transport blocks are not scheduled in adjacent slots in time. In examples the gNB may arrange for a PDCCH in a slot to schedule a PDSCH in a slot other than a next slot in time to the slot in which the PDCCH is scheduled. In examples, the gNB will refrain from signalling PDCCH in a next slot in time to a slot in which a PDSCH is scheduled.

For example, if a gNB transmits an SIB transport block in a PDSCH over two adjacent slots in time, the gNB may arrange for other PDSCH to be transmitted to the UE in a slot other than a next two slots in time to the two slots in which the SIB transport block is transmitted. Therefore the UE can use the two slots after the two slots in which the SIB transport block is transmitted to decode the SIB transport block. Once the SIB transport block has been decoded, the UE can receive and decode other PDSCH.

In a particular example, a UE may receive a first SIB transport block in a first slot and store samples of the first SIB transport block in a buffer of the UE. The UE may receive a second SIB transport block in a second slot and store samples of the second SIB transport block in the buffer of the UE. In a third slot, the gNB will not schedule PDSCH. Therefore the UE decodes the first SIB transport block in the third slot based on the samples of the first SIB transport block stored in the buffer of the UE. In a fourth slot, the gNB will not schedule PDSCH. Therefore the UE decodes the second SIB transport block in the fourth slot based on the samples of the second SIB transport block stored in the buffer of the UE. In a fifth slot and subsequent slots, the gNB may schedule other PDSCH.

In an alternative example, a UE may receive a first SIB transport block in a first slot and store samples of the first SIB transport block in a buffer of the UE. In a second slot, the gNB will not schedule PDSCH. Therefore the UE decodes the first SIB transport block in the second slot based on the samples of the first SIB transport block stored in the buffer of the UE. The UE may receive a second SIB transport block in a third slot and store samples of the second SIB transport block in the buffer of the UE. In a fourth slot, the gNB will not schedule PDSCH. Therefore the UE decodes the second SIB transport block in the fourth slot based on the samples of the second SIB transport block stored in the buffer of the UE. In a fifth slot and subsequent slots, the gNB may schedule other PDSCH.

As will be appreciated by one skilled in the art, slot duration is dependent on subcarrier spacing (SCS). For example, OFDM symbol length is determined by SCS and, since a slot is defined by 14 OFDM symbols, the slot duration is dependent on the SCS. In some examples, a UE may be capable of processing a PDSCH in one slot for a given SCS. However, for a different SCS with a shorter slot duration, one slot may not be sufficient for the UE to decode the PDSCH. In such examples, if an SIB transport block is scheduled in a first slot, then the gNB may not schedule other PDSCH in a second and third subsequent slots. In this way, the UE can decode the SIB transport block over the second and third slots.

In example embodiments, system information is transmitted as one or more system information block (SIB) messages, at least one of the SIB messages being transmitted repeatedly at a first time instant in a first and a second transport block transmitted in first and second downlink physical resources and at a second time instant in a third and a fourth transport block transmitted in third and fourth downlink physical resources. The UE can then receive the SIB message from one of the first and the second transport blocks at the first time instant and one of the third and fourth transport blocks at the second time instant. The UE can thereby receive the SIB message with a time gap between either the first transport block, and the third or fourth transport block or between the second transport block and the third or fourth transport blocks, so that the SIB message can be received with the reduced number of OFDM symbols per time slot or over a plurality of consecutive time slots and an increased number of the available sub-carriers per OFDM symbol compared to the transmission of the other downlink data during the connected phase.

According to this example, a first SIB message is transmitted at a first time instant and repeated at a second time instant with a same segmentation and packetisation. Hence, a SIB message is provided from higher layers (such as the PDCP layer) and the MAC layer segments or packetizes these, potentially large, higher layer SIB messages into one or more MAC PDUs that are transmitted as transport blocks by the physical layer. Hence the term packetize in this example means that the data of the SIB message is formed into the same packet format for transmission by the MAC layer and the data in those packets is divided into segments of the same size. The boundaries of where these segments are created are the same in a first transmission of a SIB message and a second transmission of a SIB message. At a first time instant, first and second transport blocks are carried by first and second PDSCH respectively and at a second time instant first and second transport blocks are carried by third and fourth PDSCH. In such embodiments, the transmission of the first transport block of the SIB in the first PDSCH at the first time instant may carry the same information as the transmission of the first transport block of the SIB in the third PDSCH at the second time instant. In such embodiments, the UE may decode the fourth PDSCH transmitted in the second time instant to obtain information which it did not obtain since it was unable to decode the second PDSCH at the first time instant.

In example embodiments, system information is transmitted as one or more SIB messages, at least one of the SIB messages being transmitted as a plurality of parts, a first part of the SIB message being transmitted repeatedly in first and second transport blocks in adjacent time slots or adjacent sub-slots, and a second part of the SIB message being transmitted repeatedly in third and fourth transport blocks in adjacent time slots or adjacent sub-slots. The UE can then receive the SIB message during the initial access phase of the communications session by receiving the first part of the SIB message from one of the first and the second transport blocks, and receiving the second part of the SIB message from one of the third and the fourth transport blocks. As such, the UE can receive the second part of the SIB message with a time gap from receiving the first part of the SIB message by receiving either the first transport block or the second transport block and the third transport block or the fourth transport blocks. The SIB message can be received therefore with the reduced number of OFDM symbols per time slot or over a plurality of consecutive time slots and an increased number of the available sub-carriers per OFDM symbol compared to the transmission of the other downlink data during the connected phase.

According to this example, a SIB transport block is repeated in adjacent slots in time. The UE may decode a second PDSCH carrying a second SIB transport block in a second slot if it were unable to decode a first PDSCH carrying a first SIB transport block in a first slot as a result of the reduced capability of the UE. In such embodiments, the second SIB transport block is a repetition of the first transport block.

In other example embodiments, a transport block of an SIB message can be encoded with an error correction encoder and transmitted in a plurality physical resource blocks with an encoding rate of the error correction encoding matched to a number of the plurality of physical resource blocks on which the transport block of the SIB message is transmitted. The UE can then receive the transport block of the SIB message during the initial access phase by receiving one or more of the physical resource blocks on which the transport block of the SIB message is transmitted, a number of the received physical resource blocks being less than the number of the plurality of physical resource blocks on which the SIB message was transmitted, and decoding, using an error correction decoder, the transport block of the SIB message from the number of the received physical resource blocks. The encoding rate is sufficient to recover the transport block of the SIB message from number of the received physical resource blocks, the number of the one or more of the physical resource blocks received such that the receiver receives with a reduced number of OFDM symbols per time slot or over a plurality of consecutive time slots and an increased number of the available sub-carriers per OFDM symbol compared to the transmission of the other downlink data during the connected phase.

According to one example the SIB transport blocks are rate matched to two slots. In an example, a code rate of an SIB transport block is halved. In other words, the same number of transport bits is mapped to double the number of physical bits for the SIB transport block. A reduced capability UE that misses one of the slots (as a consequence of its reduced capability) may decode the other of the two slots (at twice the code rate). In such embodiments, even if a UE is capable of decoding both of the slots, the UE benefits from increased redundancy and increased reliability of the SIB transport block because of the halved coding rate of the SIB transport block.

It will be appreciated by one skilled in the art that over the air transmissions contain a set of systematic and parity bits. A transport block may still be decoded even if only a portion of the systematic and parity bits are received by the UE.

In example embodiments, a reduced capability UE may only receive a portion of physical resources comprising an SIB.

In one example, if the SIB has a bandwidth of 20 MHz and the reduced capability UE is only capable of receiving in a 10 MHz bandwidth, the UE receives the SIB using a lower 10 MHz of the 20 MHz SIB bandwidth. In another example, the UE performs receiver-based frequency hopping. In such examples, the 10 MHz bandwidth of the SIB resources that the UE decodes changes from slot to slot. In other words, the UE may decode a lower 10 MHz of the SIB bandwidth in a first slot and decode an upper 10 MHz of the SIB in a second slot for example. In other examples, the 10 MHz bandwidth of the SIB resources that the UE decodes changes from OFDM symbol to OFDM symbol. Receiver-based frequency hopping means that additional frequency diversity that is obtained.

According to the example embodiments discussed above a reduced capability UE does not need to decode every slot. The reduced capability UE may spread out its front end processing over two slots, leading to a decrease in UE complexity as explained above.

In example embodiments a reduced capability UE may signal its reduced bandwidth capability to a gNB during a PRACH procedure. The reduced bandwidth capability may identify that the UE is able to decode a wider bandwidth with a restriction on the amount of time the UE is able to receive that wider bandwidth.

In example embodiments, the UE reduced bandwidth capability is signalled by a PRACH preamble chosen by the UE from a PRACH partition. If a gNB receives a PRACH from the partition from which the UE chose the PRACH preamble, the gNB may respond in example embodiments by sending and receiving further messages (for example, PDCCH, PDSCH, and PUSCH) such that there is a time gap between these transmissions (in order to allow the UE to perform front-end processing of these channels over more than a single slot).

In other example embodiments, the gNB may respond by sending and receiving further messages (for example PDCCH, PDSCH and PUSCH) in a narrower bandwidth than the initial access bandwidth. For example, if the initial access bandwidth is 20 MHz, then the further messages may be transmitted in a 10 MHz bandwidth.

In some embodiments, there may be more than one PRACH partition that supports reduced bandwidth capability UEs. A first PRACH partition may be used to allow the reduced capability UE to signal that it can operate in a reduced complexity mode if the time between the further messages is increased as explained above. A second PRACH partition may be used to allow the UE to indicate that it can operate in a reduced complexity mode if the bandwidth for further messages is reduced as explained above.

In some embodiments, PRACH partitioning can be used to indicate other complexity reduction techniques during the initial access procedure. For example, a UE may use a PRACH from a PRACH partition to indicate that the UE has a reduced number of RX antennas. The gNB may respond by assigning PDSCH resources using coverage recovery techniques. For example, the PDSCH may be transmitted using a lower MCS.

In example embodiments, a UE may use a PRACH from a PRACH partition to indicate that the UE does not support Half-Duplex Frequency Division Duplexing (HD-FDD). The gNB may respond by not scheduling the UE with both DL resources and UL resources in the same slot.

In some embodiments, the reduced bandwidth capability of the device is transmitted in Msg3 of the RACH procedure.

According to some example embodiments, the UE may determine, based on the maximum rate of processing the data received during the connected phase that it cannot receive the downlink data in the initial access phase from the greater number of sub-carriers available within the greater frequency domain physical resources than the OFDM symbols in the connected phase within the smaller frequency domain physical resources. The UE can then transmit an indication that it cannot receive the downlink data in the initial access phase from the greater number of available sub-carriers within the greater frequency domain physical resources. In one example, the indication is transmitted in Message 3 of a RACH procedure used by the UE to establish the communication session. The downlink data is therefore subsequently received during the initial access phase from the reduced number of OFDM symbols per time slot or over a plurality of consecutive time slots compared to the transmission of the other downlink data during the connected phase.

In such embodiments, Msg4 of the RACH procedure and subsequent messages may be transmitted and received such that there is a time gap between these transmissions (in order to allow the UE to perform front-end processing of these channels over more than a single slot).

In other example embodiments, Msg4 of the RACH procedure and subsequent messages may be transmitted and received in a narrower bandwidth than the initial access bandwidth. For example, if the initial access bandwidth is 20 MHz, then the Msg4 and subsequent messages may be transmitted in a 10 MHz bandwidth.

Connected Phase Bandwidth is Larger than Initial Access Phase Bandwidth

In some embodiments, the connected mode bandwidth is greater than the initial access bandwidth. In such embodiments, the UE is not scheduled with back-to-back resources in connected mode.

In example embodiments, the UE does not decode resources allocated on every OFDM symbol but, for the resources allocated on the OFDM symbols that the UE does decode, it decodes a bandwidth wider than the bandwidth that it is capable of decoding during the initial access phase, for example the UE decodes the full bandwidth of the OFDM symbol. Front-end processing for the wider bandwidth can then be spread across a longer period of time, thereby reducing an average processing load for the UE. An example of the reducing the average processing load in a reduced capability UE according to such embodiments is explained below with reference to FIGS. 7A, 7B and 7C.

FIG. 7A illustrates a processing procedure for a UE capable of decoding a full 40 MHz system bandwidth in adjacent OFDM symbols. In other words, the UE processes samples received within an OFDM symbol during a single OFDM symbol. An indication of a time taken to process each OFDM symbol is given by horizontal arrows 702.

FIG. 7B illustrates a processing procedure for a reduced capability UE that is capable of decoding 20 MHz bandwidth for adjacent OFDM symbols.

FIG. 7C illustrates a processing procedure for a reduced capability UE that is capable of decoding 20 MHz bandwidth for adjacent OFDM symbols according to exemplary embodiments. The UE used in FIG. 7C may have similar front end processing requirements as the UE in FIG. 7B. An indication of a time taken to process each OFDM symbol is given by horizontal arrows 704.

As will be appreciated from FIG. 7C, the reduced capability UE is allocated resources in alternate OFDM symbols across the 40 MHz bandwidth. In such a way, the reduced capability UE decodes a lower 20 MHz 708 of the 40 MHz bandwidth resources allocated in a first symbol. The UE decodes the lower 20 MHz 708 of the 40 MHz bandwidth resources in the same symbol in which the resources were allocated. The UE then decodes an upper 20 MHz 710 of the 40 MHz bandwidth resources which were allocated in the first OFDM symbol in an adjacent second OFDM symbol as indicated by arrow 712 An indication of a time taken to process each OFDM symbol is given by horizontal arrows 706.

Therefore front end processing per OFDM symbol for the reduced capability UE extends across two OFDM symbols but an average front-end processing per symbol is the same as for the UE in FIG. 7B.

In such embodiments, the reduced capability UE is not required to decode PDSCH in every sub-slot/OFDM symbol of a slot. Therefore the reduced capability UE does not monitor every OFDM symbol within a slot.

In example embodiments, a gNB may allocate resources for a reduced capability UE in odd OFDM symbols within a slot or even OFDM symbols within a slot.

For example, FIG. 8 illustrates a UE being allocated resources in alternate OFDM symbols of a slot. An indication of a time taken to process each OFDM symbol is given by horizontal arrows 802. As will be appreciated from FIG. 8, a first UE is allocated resources in alternate OFDM symbols of a first slot 804.

Front-end processing operations in the UE do not have to perform operations in a single OFDM symbol, but can extend those operations to cover two OFDM symbols. In such a way, the front-end processing complexity in the UE is reduced. In examples where front-end processing requirements are proportional to a maximum bandwidth that a UE could decode in OFDM symbols, then if the UE only has to process every other OFDM symbol, it can process twice the bandwidth of a UE that had to process every OFDM symbol in a slot.

For example, if a UE that has a capability to decode a 20 MHz bandwidth signal when it receives every OFDM symbol in a slot then it can decode a signal with a 40 MHz bandwidth when it receives every second OFDM symbol in a slot.

FIG. 9 illustrates an example of multiplexing resources allocated to two UEs. As will be appreciated from FIG. 9, a first UE receives resources on odd OFDM symbols and a second UE receives resources on even OFDM symbols in a first slot 908. An indication of a time taken to process each OFDM symbol is given by horizontal arrows 904, 906 for the first and second UE respectively. Such embodiments efficiently use all system resources as will be appreciated by FIG. 9.

In such embodiments, a UE should become aware of which OFDM symbols it should decode. For example, the first UE should become aware that it should only decode even OFDM symbols whereas the second UE should become aware that it should only decode odd OFDM symbols.

In example embodiments, a gNB may transmit downlink control information (DCI) to inform a UE of which OFDM symbols it should decode. For example, the DCI may indicate whether the UE should decode either even or odd OFDM symbols.

In example embodiments, a UE may determine whether it should decode a PDSCH using odd OFDM symbols or even OFDM symbols by the odd/even OFDM symbol state of the DCI that allocated the PDSCH. For example, if the PDCCH carrying the DCI is received in an even OFDM symbol then the PDSCH is also received in even OFDM symbols. In another example, if the last OFDM symbol of the PDCCH carrying the DCI is received in an even OFDM symbol then the PDSCH is also received in even OFDM symbols.

In example embodiments, a gNB may use RRC signals to inform a UE of which OFDM symbols it should decode. In example embodiments, the UE may be informed of which OFDM symbols it should decode from a Least Significant Bit (LSB) of an International Mobile Subscriber Identity (IMSI)/International Mobile Equipment Identity (IMEI).

A slot may be split into a plurality of sub-slots or mini-slots in NR as will be appreciated by one skilled in the art. In example embodiments, a reduced capability UE may be allocated one or more slots, but only receives resources in every other sub-slot. In example embodiments, the sub-slots which do not contain resources for the reduced capability UE may contain resources for another reduced capability UE.

In other embodiments, the sub-slots which do not contain resources for the reduced capability UE may contain resources for other UEs which may not be reduced capability UEs. For example, the sub-slots which do not contain resources for the reduced capability UE may contain resources for NR URLLC UEs.

Such embodiments increase scheduling flexibility and reduce resource wastage as will be explained with reference to FIG. 10.

Figure 10:
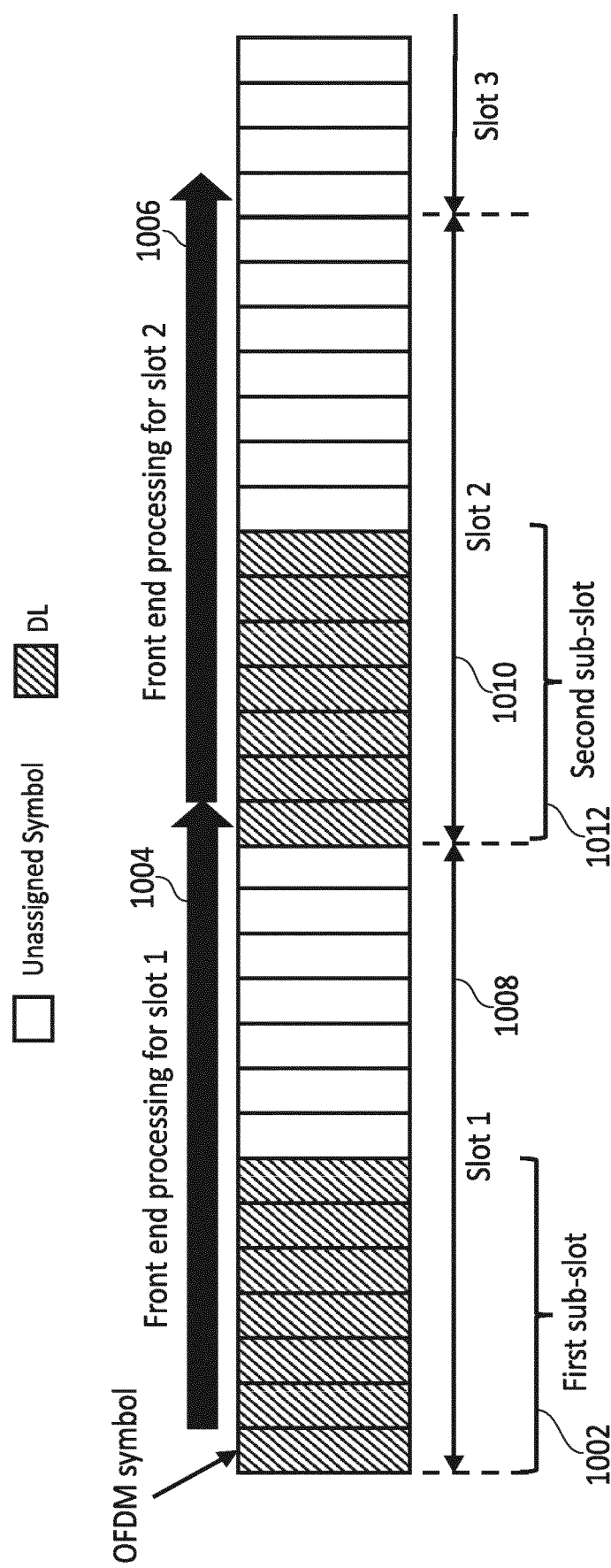
FIG. 10 is a schematic frequency against time diagram illustrating an allocation of resources for a reduced capability UE on alternate sub-slots according to exemplary embodiments.

FIG. 10 provides an illustrative example of a reduced capability UE decoding alternate sub-slots according to example embodiments. As shown in FIG. 10, resources have been allocated in a first 7 OFDM symbol long sub-slot/mini-slot 1002 contained within a full slot duration of a first slot 1008. Resources have also been allocated in a second 7 OFDM symbol long sub-slot/mini-slot 1012 contained within a full slot duration of a second slot 1010. An indication of a time taken to process each sub-slot is given by horizontal arrows 1004, 1006 for the first and the second slot 1008, 1010 respectively. In accordance with example embodiments, a single transport block may be mapped to both the first and second sub-slots 1002, 1012.

Figure 11:
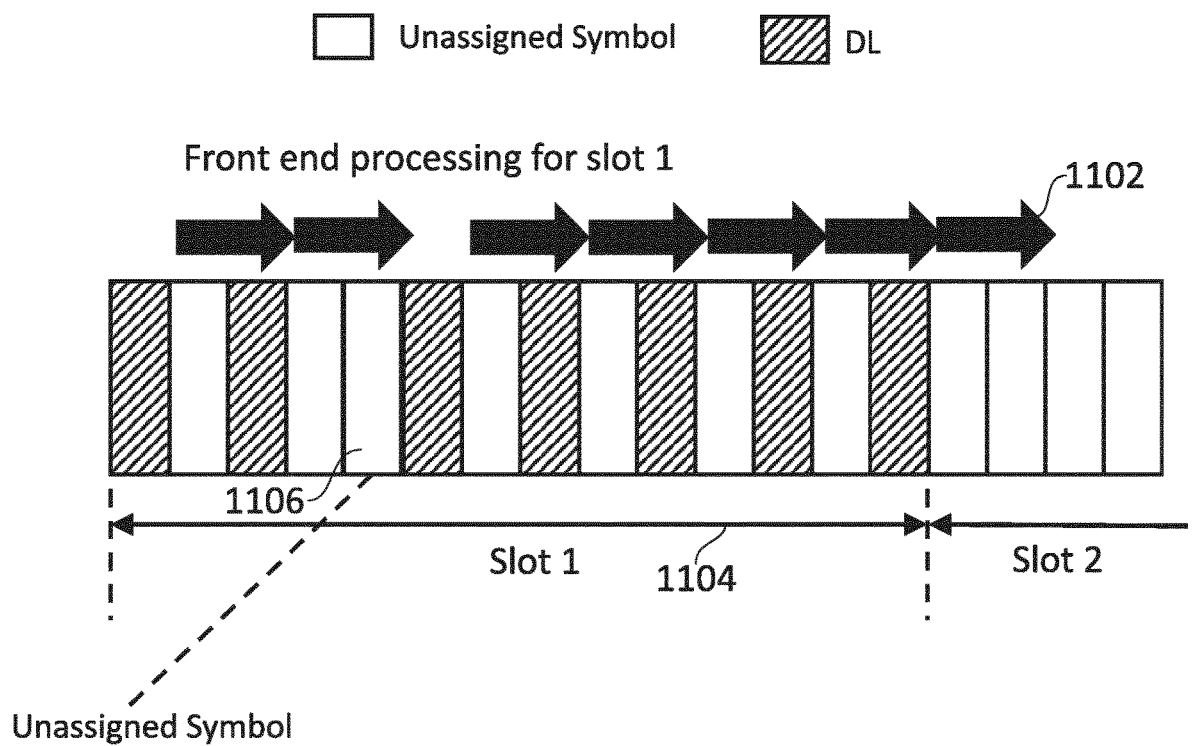
FIG. 11 is a schematic frequency against time diagram illustrating a non-periodic allocation of resources for a reduced capability UE according to exemplary embodiments.

In example, embodiments, such as those explained with reference to FIGS. 8 and 9 above, a reduced capability UE is allocated resources periodically (on alternate OFDM symbols). In other embodiments, the reduced capability UE is not allocated resources periodically but the gNB nevertheless ensures that the reduced capability UE is not allocated resources on consecutive OFDM symbols For example, FIG. 11 illustrates an example in which the gNB allocates non-periodic resources to a reduced capability UE but nevertheless ensures that resources are not allocated for the reduced capability UE on consecutive resources. An indication of a time taken to process each OFDM symbol is given by horizontal arrows 1102. As will be appreciated from FIG. 11, there is no arrow corresponding to a processing time for the unassigned symbol 1106 in a first slot 1104.

In example embodiments, a reduced capability UE and a gNB compare a maximum processing capability of the reduced capability UE with resources currently being used by the reduced capability UE or scheduled to be used by the UE to determine an amount of available resources of the reduced capability UE. The phrase "available resources of the reduced capability UE" has been used herein to mean an amount of physical resources which the UE may decode in addition to physical resources that the UE is currently decoding in accordance with the capability of the UE.

If the reduced capability UE has completed reception of a signal, sub-slot, slot, and/or OFDM symbol, the amount of available resources of the reduced capability UE is increased. If the reduced capability UE has been scheduled to perform future reception (and hence front-end processing) of a signal, sub-slot, slot, and/or OFDM symbol, the amount of available processing resources of the reduced capability UE is decreased.

In such a way, if the gNB wishes to allocate a quantity of physical resources to the UE, it may do so if the amount of available resources is at least as large as the quantity of physical resources which the gNB wishes to allocate.

In such embodiments, the amount of available resources of the reduced capability UE may be synchronised between the reduced capability UE and the gNB.

For example, the amount of available resources of the reduced capability UE may be synchronised between the reduced capability UE and the gNB if the reduced capability UE and the gNB implement the same pre-defined model for increasing/decreasing for determining the amount of available resources.

The reduced capability UE may continuously transmit feedback to the gNB. For example the UE may transmit an indication on an amount of available resources or may transmit an indication that the reduced capability UE has sufficient available resources to allow further physical resources to be allocated to the UE.

In some embodiments, there may be a plurality of reduced capability UEs each with a different processing capability. For example, each of the plurality of reduced capability UEs may be capable of decoding a different number of PDSCHs per timespan per bandwidth. For example, one of the plurality of reduced capability UEs may be capable of decoding one PDSCH transport block of 1000 bits per 2 OFDM symbols at in a 40 MHz bandwidth. In such embodiments, each of the plurality of UEs may signal their processing capability to the network. In such a way, the gNB can then ensure that its scheduling does not overload processors of the reduced capability UEs.

Each of the plurality of reduced capability UEs must meet a basic processing requirement for the initial access phase. Each of the plurality of reduced capability UEs may signal their processing capability for the connected phase.

In example embodiments, a reduced capability UE drops one or more messages if the gNB schedules the one or more messages such that processing of the one or more messages is beyond a processing capability of the UE. In some examples, the reduced capability UE drops the latest message (e.g. PDSCH) when its processing limit is reached. For example, if the UE can process one PDSCH in two slots and the gNB schedules the UE one PDSCH per slot over the two slots, the UE will drop the $2^{nd}$ PDSCH.

As explained above with reference to FIG. 7C, a reduced capability UE may defer processing of 20 MHz-wide portions of the a 40 MHz bandwidth OFDM symbol. Such embodiments reduce peak digital front-end processing load within the UE. However, in such embodiments, the reduced capability UE samples across the 40 MHz bandwidth and stores a number of samples associated with the 40 MHz bandwidth. As will be appreciated by one skilled in the art, the reduced capability UE must sample at 80 Million samples/sec according to Nyquist's theorem.

Figure 12:
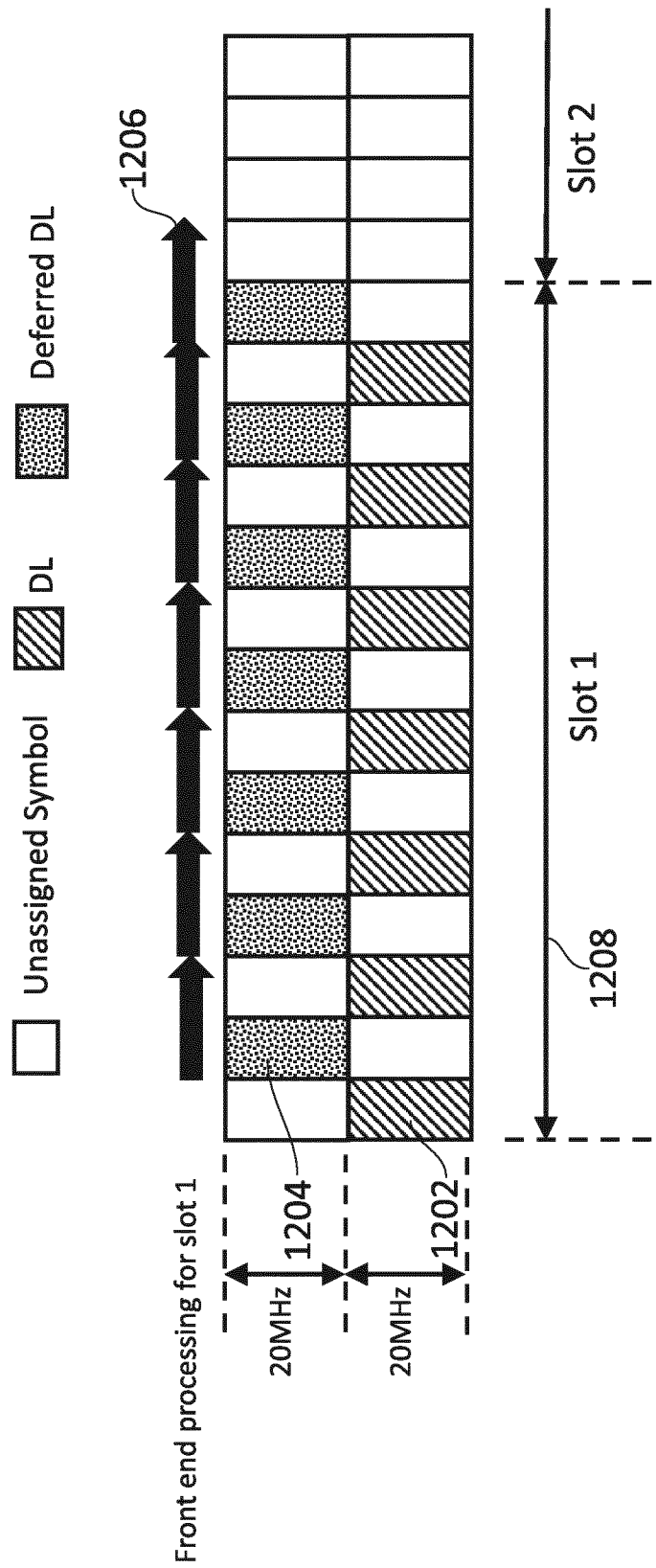
FIG. 12 is a schematic frequency against time diagram illustrating deferring a time at which 20 MHz-wide portions of a 40 MHz bandwidth OFDM symbol are transmitted to a reduced capability UE in accordance with exemplary embodiments.

In example embodiments, a reduction of the sampling rate (number of samples per second) and sample buffer size can be achieved by deferring a time at which the 20 MHz-wide portions of the 40 MHz bandwidth OFDM symbol are transmitted by a gNB, as shown in FIG. 12.

FIG. 12 shows that a lower 20 MHz of the 40 MHz bandwidth is sent in a first OFDM symbol 1202 and an upper 20 MHz of the 40 MHz bandwidth is sent in a second OFDM symbol 1204. In the example shown in FIG. 12, the UE only has to sample 20 MHz of bandwidth and only requires an amount of sample buffer memory sufficient for 20 MHz of bandwidth. As will be appreciated by one skilled in the art, the reduced capability UE only needs to sample at 40 Million samples/sec according to Nyguist's theorem. An indication of a time taken to process each pair (for example, the first OFDM symbol 1202 and the second OFDM symbol 1204) of OFDM symbols in a first slot 1208 is given by horizontal arrows 1206.

As will be appreciated by one skilled in the art, FIG. 12 illustrates an example of frequency hopping. In such embodiments, the use of the second "hop" may occur if the UE is allocated more than its maximum bandwidth capability (20 MHz in this example) to reduce processing requirements. However, if the UE is allocated less than its maximum bandwidth capability, frequency hopping such as that shown in FIG. 12 may occur within the UE's maximum bandwidth to improve frequency diversity. In other words, frequency hopping for a reduced capability device may occur to reduce processing requirements if the UE is allocated with more frequency resources than the UE is capable of decoding in consecutive OFDM symbols.

As illustrated in FIG. 12 above, in some embodiments, a UE in the connected phase may receive downlink data on a reduced number of sub-carriers (in other words, receiving downlink data in 20 MHz rather than 40 MHz). In such embodiments, the UE may receive a signal with a bandwidth wider than 20 MHz and perform measurements on the received signal. After performing the measurements on the received signal from sub-carriers across wider than 20 MHz, the UE does not receive downlink data during a time gap of one or more OFDM symbols, so that there is no increase in the maximum processing rate required by the UE during the connected mode. The UE may then perform front-end processing on the received signal during the time gap. Examples of the received signal include:

Channel state information reference signals (CSI-RS). CSI-RSs can be used to make measurements on beams.

Positioning reference signals (PRS). PRS s can be transmitted by multiple gNBs and the UE can perform measurements on the time difference of arrival of these signals Based on reports of such measurement, a location server can triangulate or otherwise determine the location of the UE. It will be appreciated by one skilled in the art that using a PRS with a bandwidth wider than frequency domain physical resources occupied by the reduced number of the available sub-carriers of the connected phase can lead to more accurate timing measurements.

Example embodiments presented above provide methods of reducing a processing burden in reduced capability UEs.

In some embodiments, a different processing burden reduction method may be used for different bandwidth parts (BWP). In other words, a plurality of BWPs may each be associated with a different processing reduction method. As will be appreciated by one skilled in the art, a BWP is a contiguous set of physical resource blocks (PRBs) on a given carrier.

For example, a first BWP may be configured to reduce the processing burden by a first method (for example, the reduced capability UE may not be allocated resources in adjacent OFDM symbols as explained above). A second BWP may be configured to reduce the processing burden by a second method (for example, the reduced capability UE may not be allocated resources in adjacent sub-slots as explained above). In other words, the first BWP and second BWP may be associated with a first and second processing burden reduction method. A gNB may therefore switch between processing burden reduction methods by switching BWPs. BWP switching techniques will be known to one skilled in the art.

An optimum processing burden reduction method may vary depending on the bandwidth of the BWP. For example, the first method may be the optimum method for a 40 MHz BWP and the second method may be the optimum method for a 20 MHz BWP.

In other embodiments, the method to reduce the processing burden is signalled in RRC signalling. For example, a UE may transmit capability information to a gNB including an indication that the UE is a reduced capability UE. In response, the gNB may select the method to reduce the processing burden and transmit an indication of the selected method to reduce the processing burden to the UE.

In some embodiments, a different processing burden reduction method may be used for different SCSs. In other words, a plurality of SCSs may each be associated with a different processing reduction method. NR can support an SCS of 15, 30, 60, 120, and 240 kHz. OFDM symbol length and slot length is determined by the SCS. For example, slot lengths for SCS of 15, 30, 60, 120, and 240 kHz are 1, 0.5, 0.25, 0.125, and 0.0625 ms respectively.

Therefore, if UE processing front end processing time is quantified in terms of a number of slots or OFDM symbols, the number depends on the SCS.

In other words, the front end processing time lengths discussed in example embodiments above may be predetermined as a function of SCS. Alternatively, the front end processing time lengths may be configured for a reduced capability UE depending on the SCS. An example of front end processing time lengths and corresponding SCS is shown in Table 1. As will be appreciated from Table 1, the relationship between the SCS and the number for front end processing time symbols is not necessarily linear.

TABLE 1

Front end processing time as a function of SCS

| SCS (kHz) | Front end processing time (OFDM symbols) |
|---|---|
| 15 | 14 |
| 30 | 26 |
| 60 | 48 |
| 120 | 102 |
| 240 | 198 |

Figure 13:
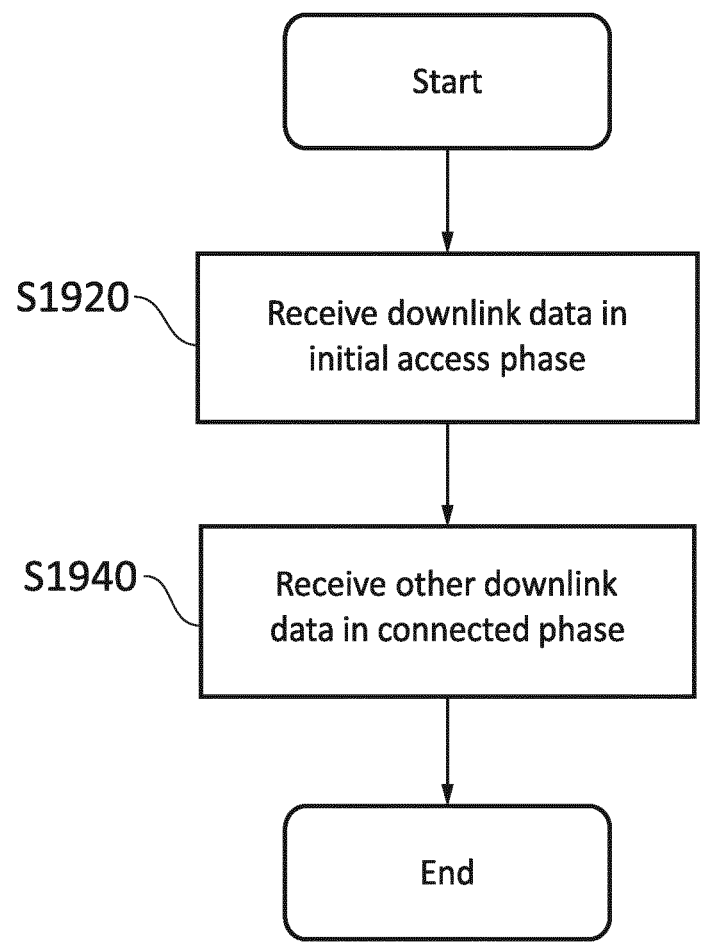
FIG. 13 is a flow diagram illustrating a method of receiving data at a communications device from a wireless communications network according to example embodiments.

FIG. 13 is a flow diagram illustrating a method of receiving data at a communications device from a wireless communications network according to example embodiments. After a start point, the communications device receives downlink data during an initial access phase of a communications session of the communications device from a wireless access interface provided by the wireless communications network in step S1920.

As will be appreciated by one skilled in the art, an initial access phase and a connected phase of an operation of a communications device form part of a communications session of the communications device. The communications session may be established between the communications device and a core network for example and comprises communications between the core network and the communications device.

In step S1940, the communications device receives other downlink data during a connected phase of the communications session of the communications device transmitted to the communications device via the wireless access interface. The wireless access interface provides communications resources comprising a predetermined number of OFDM symbols in each of a plurality of time slots. The OFDM symbols in the initial access phase have a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources.

Receiving the downlink data during the initial access phase in step S1920 comprises receiving the downlink data from a reduced number of OFDM symbols per time slot or over a plurality of consecutive time slots and an increased number of the available sub-carriers per OFDM symbol compared to the receiving of the other downlink data during the connected phase, or a reduced number of the available sub-carriers per OFDM symbol of the initial access phase and an increased or the same number of OFDM symbols per time slot or over a plurality of consecutive time slots compared to the receiving of the other downlink data during the connected phase.

Receiving the downlink data during the initial access phase in step S1920 includes processing the downlink data with a maximum rate of processing the downlink data which is less than or equal to a maximum rate of processing the other downlink data received during the connected phase. After step S1940, the method ends.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Respective features of the present disclosure are defined by the following numbered paragraphs:

Paragraph 1. A method of receiving data at a communications device from a wireless communications network, the method comprising
  receiving, by a receiver of the communications device, downlink data during an initial access phase of a communications session of the communications device from a wireless access interface provided by the wireless communications network, and
  receiving, by the receiver of the communications device, other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the receiving the downlink data during the initial access phase, comprises receiving the downlink data from
  a reduced number of OFDM symbols per time slot or over a plurality of consecutive time slots and an increased number of the available sub-carriers per OFDM symbol compared to the receiving of the other downlink data during the connected phase, or
  a reduced number of the available sub-carriers per OFDM symbol of the initial access phase and an increased or the same number of OFDM symbols per time slot or over a plurality of consecutive time slots compared to the receiving of the other downlink data during the connected phase, and the receiving, by the receiver of the communications device, the downlink data during the initial access phase includes
processing the downlink data with a maximum rate of processing the downlink data which is less than or equal to a maximum rate of processing the other downlink data received during the connected phase.

Paragraph 2. A method according to paragraph 1, wherein the receiving the downlink data, during the initial access phase, comprises receiving the downlink data from the same number of OFDM symbols per time slot and the same number of the available sub-carriers per OFDM symbol compared to the receiving of the other downlink data during the connected phase, the downlink data being received on the available sub-carriers which are displaced in frequency within the greater frequency domain physical resources of the initial access phase between consecutive OFDM symbols.

Paragraph 3. A method according to paragraph 1, wherein the receiving the downlink data, during the initial access phase, comprises receiving the downlink data from a reduced number of OFDM symbols over a plurality of consecutive time slots and an increased number of the available sub-carriers per OFDM symbol compared to the receiving of the other downlink data during the connected phase, the downlink data being received in a larger number of the OFDM symbols in a first of the plurality of consecutive time slots than the OFDM symbols in a second of the consecutive time slots.

Paragraph 4. A method according to paragraph 3, wherein the downlink data is received in the first of the plurality of consecutive time slots and not in a second of the consecutive time slots. Paragraph 5. A method according to paragraph 1, wherein the receiving the downlink data, during the initial access phase, comprises receiving the downlink data from a reduced number of OFDM symbols per time slot and an increased number of the available sub-carriers per OFDM symbol compared to the receiving of the other downlink data during the connected phase, the downlink data being received in the OFDM symbols in a first sub-slot of a time slot and not a second sub-slot of a time slot.

Paragraph 6. A method according to any of paragraphs 1 to 5, wherein the downlink data is system information.

Paragraph 7. A method according to paragraph 6, wherein the system information is received as a plurality of system information blocks, SIBs, and the receiving, by the receiver of the communications device, the downlink data during the initial access phase of the communications session comprises receiving a second of the plurality of SIBs after a time gap from receiving a first of the plurality of SIBs.

Paragraph 8. A method according to paragraph 7, wherein the time gap is at least one time slot.

Paragraph 9. A method according to any of paragraphs 6 to 8, wherein the system information is received as one or more system information block, SIB, messages, at least one of the SIB messages being transmitted repeatedly at a first time instant in a first and a second transport block transmitted in first and second downlink physical resources and at a second time instant in a third and a fourth transport block transmitted in third and fourth downlink physical resources, and the receiving, by the receiver of the communications device, the downlink data during the initial access phase of the communications session comprises receiving the SIB message from one of the first and the second transport blocks at the first time instant and one of the third and fourth transport blocks at the second time instant, the receiving the SIB message being with a time gap between either the first transport block, and the third or fourth transport blocks or between the second transport block and the third or fourth transport blocks, and the SIB message being received with the reduced number of OFDM symbols per time slot or over a plurality of consecutive time slots and an increased number of the available sub-carriers per OFDM symbol compared to the receiving of the other downlink data during the connected phase.

Paragraph 10. A method according to paragraph 9, wherein the SIB message is transmitted at the first time instant and the second time instant with a same segmentation and packetisation.

Paragraph 11. A method according to any of paragraphs 6 to 8, wherein the system information is received as one or more system information block, SIB, messages, at least one of the SIB messages being transmitted as a plurality of parts, a first part of the SIB message being transmitted repeatedly in first and second transport blocks in adjacent time slots or adjacent sub-slots, and a second part of the SIB message being transmitted repeatedly in third and fourth transport blocks in adjacent time slots time slots or adjacent sub-slots, and the receiving, by the receiver of the communications device, the downlink data during the initial access phase of the communications session comprises receiving the first part of the SIB message from one of the first and the second transport blocks, and
  receiving the second part of the SIB message from one of the third and the fourth transport blocks, the receiving the second part of the SIB message being with a time gap from receiving the first part of the SIB message by receiving either the first transport block or the second transport block and the third transport block or the fourth transport blocks.

Paragraph 12. A method according to any of paragraphs 6 to 8, wherein the system information is transmitted as one or more transport blocks of a SIB message, where each transport block is encoded with an error correction encoder and transmitted in a plurality of physical resource blocks with an encoding rate of the error correction encoding which is matched to a number of the plurality of physical resource blocks on which the transport block of the SIB message is transmitted, and the receiving, by the receiver of the communications device, the downlink data during the initial access phase of the communications session comprises receiving one or more of the physical resource blocks on which the SIB message is transmitted, a number of the received physical resource blocks being less than the number of the plurality of physical resource blocks on which the transport block of the SIB message was transmitted, and
  decoding, using an error correction decoder the transport block of the SIB message from the number of the received physical resource blocks, the encoding rate being sufficient to recover the transport block of the SIB message from number of the received physical resource blocks, the number of physical resource blocks transmitted being larger compared to the number transmitted for the other downlink data during the connected phase.

Paragraph 13. A method according to paragraph 1, comprising selecting, a Physical Random Access Channel, PRACH, preamble from a plurality of PRACH partitions, each PRACH partition comprising a plurality of PRACH preambles and either
  receiving, by the receiver in the communications device, a plurality of subsequent downlink messages in the initial access phase such that a time gap between each transmission is at least one time slot in length or
  receiving the plurality of subsequent downlink messages in the initial access phase on the reduced number of the available sub-carriers per OFDM symbol of the initial access phase and an increased or the same number of OFDM symbols per time slot or over a plurality of consecutive time slots compared to the receiving of the other downlink data during the connected phase Paragraph 14. A method according to any of paragraphs 1 to 11, comprising determining, by the communications device, based on the maximum rate of processing the other downlink data received during the connected phase that it cannot receive the downlink data in the initial access phase from the greater number of sub-carriers available to carry the downlink data within the greater frequency domain physical resources than the OFDM symbols in the connected phase in which the OFDM symbols have the smaller number of sub-carriers available to carry the other downlink data within the smaller frequency domain physical resources,
  transmitting, by transmitter circuitry in the communications device, an indication that the communications device cannot receive the downlink data in the initial access phase from the greater number of available sub-carriers to carry the downlink data within the greater frequency domain physical resources, the indication being transmitted in Message 3, Msg 3, of a random access channel (RACH) procedure used by the UE to establish the communication session, the downlink data being subsequently received during the initial access phase from the reduced number of OFDM symbols per time slot or over a plurality of consecutive time slots and the increased number of the available sub-carriers per OFDM symbol compared to the receiving of the other downlink data during the connected phase, or the increased or the same number of OFDM symbols per time slot and the reduced number of the available sub-carriers per OFDM symbol compared to the receiving of the other downlink data during the connected phase.

Paragraph 15. A method of receiving data at a communications device from a wireless communications network, the method comprising receiving, by a receiver of the communications device, downlink data during an initial access phase of a communications session of the communications device from a wireless access interface provided by the wireless communications network, and receiving, by the receiver of the communications device, other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the connected phase having a greater number of sub-carriers available to carry the other downlink data within greater frequency domain physical resources than the OFDM symbols in the initial access phase in which the OFDM symbols have a smaller number of sub-carriers available to carry the downlink data within smaller frequency domain physical resources, wherein the receiving the other downlink data, during the connected phase, comprises receiving the other downlink data from a reduced number of OFDM symbols per time slot or over a plurality of consecutive time slots and an increased number of the available sub-carriers per OFDM symbol compared to the receiving of the downlink data during the initial access phase, or a reduced number of the available sub-carriers per OFDM symbol of the connected phase and an increased or the same number of OFDM symbols per time slot or over a plurality of consecutive time slots compared to the receiving of the downlink data during the initial access phase, and the receiving, by the receiver of the communications device, the other downlink data during the initial access phase includes processing the other downlink data with a maximum rate of processing the other downlink data which is less than or equal to a maximum rate of processing the downlink data received during the initial access phase.

Paragraph 16. A method according to paragraph 15, wherein the receiving the other downlink data, during the connected phase, comprises receiving the other downlink data from the same number of OFDM symbols per time slot and the same number of the available sub-carriers per OFDM symbol compared to the receiving of the downlink data during the initial access phase, the other downlink data being received on the available sub-carriers which are displaced in frequency within the greater frequency domain physical resources of the connected phase between consecutive OFDM symbols.

Paragraph 17. A method according to paragraph 15, wherein the receiving the other downlink data, during the connected phase, comprises receiving the other downlink data from a reduced number of OFDM symbols over a plurality of consecutive time slots and an increased number of the available sub-carriers per OFDM symbol compared to the receiving of the downlink data during the initial access phase, the other downlink data being received in a larger number of the OFDM symbols in a first of the plurality of consecutive time slots than the OFDM symbols in a second of the consecutive time slots.

Paragraph 18. A method according to paragraph 17, wherein the other downlink data is received in the first of the plurality of consecutive time slots and not in a second of the consecutive time slots.

Paragraph 19. A method according to paragraph 15, wherein the receiving the other downlink data, during the connected phase, comprises receiving the other downlink data from a reduced number of OFDM symbols per time slot and an increased number of the available sub-carriers per OFDM symbol compared to the receiving of the downlink data during the initial access phase, the other downlink data being received in the OFDM symbols in a first sub-slot of a time slot and not a second sub-slot of a time slot. Paragraph 20. A method according to paragraph 15, wherein the receiving, by the receiver of the communications device, the other downlink data during the connected phase of the communications session, comprises receiving the other downlink data in a plurality OFDM symbols, each of the plurality of OFDM symbols in which the downlink data is received being separated in time by at least one OFDM symbol in which resources are not assigned to the communications device;

determining, by the communications device, based on the maximum processing rate of processing the downlink data during the initial access phase, that it cannot receive the other downlink data in the connected phase from the greater number of sub-carriers available to carry the other downlink data within the greater frequency domain physical resources than the OFDM symbols in the initial access phase in which the OFDM symbols have the smaller number of sub-carriers available to carry the downlink data within the smaller frequency domain physical resources;

processing the other downlink data received in each of the plurality of OFDM symbols over a time period corresponding to two OFDM symbols.

Paragraph 21. A method according to paragraph 20, wherein the receiving the other downlink data in a plurality OFDM symbols, each of the plurality of OFDM symbols in which the downlink data is received being separated in time by an OFDM symbol in which resources are not assigned to the communications device comprises receiving the other downlink data in even or odd OFDM symbols in a slot, the other of the even or odd symbols in the slot being OFDM symbols in which resources are not assigned to the communications device.

Paragraph 22. A method according to paragraph 21, comprising receiving, by the receiver in the communications device, downlink control information, DCI, providing an indication of whether the downlink data will be transmitted to the UE on even or odd OFDM symbols.

Paragraph 23. A method according to paragraph 22, wherein the receiving, by the receiver in the communications device, downlink control information, DCI, providing an indication of whether the other downlink data will be transmitted to the UE on even or odd OFDM symbols comprises receiving the DCI in a Physical Downlink Control Channel, PDCCH, identifying, from the PDCCH, whether the downlink control information was received by the communications device on even or odd OFDM symbols;

determining that the other downlink data will be received on even OFDM symbols if the PDCCH was received on even OFDM symbols or determining that the other downlink data will be received on odd OFDM symbols if the PDCCH was received on odd OFDM symbols.

Paragraph 24. A method according to any of paragraphs 21 to 23, comprising receiving, by the receiver in the communications device, a radio resource control, RRC, signal providing an indication of whether the other downlink data will be transmitted to the UE on even or odd OFDM symbols.

Paragraph 25. A method according to paragraph 15, wherein the receiving, by the receiver of the communications device, the other downlink data during the connected phase of the communications session comprises receiving the other downlink data in a plurality sub slots, each of the plurality of sub slots in which the downlink data is received being separated in time by a sub slot in which resources are not assigned to the communications device, wherein a sub slot is shorter in time than a time slot;

determining, by the communications device, based on the maximum rate of processing the downlink data in the initial access phase, that it cannot receive the other downlink data in the connected phase from the greater number of sub-carriers available to carry the other downlink data within the greater frequency domain physical resources than the OFDM symbols in the initial access phase in which the OFDM symbols have the smaller number of sub-carriers available to carry the downlink data within the smaller frequency domain physical resources;

processing the other downlink data received in each of the plurality of sub slots over a time period corresponding to two sub slots.

Paragraph 26. A method according to any of paragraphs 15 to 25, comprising maintaining, by the communications device, a record of an amount of available resources which the communications device can process in addition to resources currently being processed by the communications device;

transmitting, by transmitter circuitry in the communications device, an indication of the record of the amount of available resources.

Paragraph 27. A method according to paragraph 26, wherein the transmitting, by transmitter circuitry in the communications device, an indication of the record of the amount of available resources comprises transmitting the amount of available resources or an indication of whether or not the communications device can receive additional resources continuously.

Paragraph 28. A method according to any of paragraphs 15 to 27, comprising determining, by the communications device, based on the maximum rate of processing the downlink data received during the initial access phase, that it cannot receive the downlink data in the connected phase from the greater number of sub-carriers available to carry the other downlink data within the greater frequency domain physical resources than the OFDM symbols in the initial access phase in which the OFDM symbols have the smaller number of sub-carriers available to carry the downlink data within the smaller frequency domain physical resources transmitting, by transmitter circuitry in the communications device, an indication that the communications device cannot receive the other downlink data in the connected phase from the greater number of available sub-carriers to carry the other downlink data within the greater frequency domain physical resources.

Paragraph 29. A method according to any of paragraphs 15 to 28, comprising determining that a processing limit of the communications device has been reached or exceeded based on the maximum rate of processing the downlink data during the initial access phase;

refraining from receiving other downlink data while the processing limit of the communications device has been reached or exceeded.

Paragraph 30. A method according to paragraph 15, wherein the receiving, by the receiver of the communications device, the other downlink data during the connected phase of the communications session comprises receiving the other downlink data in a same number of OFDM symbols per time slot compared to the transmission of the downlink data during the initial access phase, wherein the receiving the other downlink data in the same number of OFDM symbols per time slot compared to the transmission of the downlink data during the initial access phase comprises receiving a lower frequency portion of the other downlink data in alternate OFDM symbols of the plurality of OFDM symbols;

receiving an upper frequency portion of the other downlink data in other alternate OFDM symbols of the plurality of OFDM symbols.

Paragraph 31. A method according to any one of paragraphs 15 to 29, comprising receiving, by the receiver of the communications device, the other downlink data from the reduced number of available sub-carriers per OFDM symbol of the connected phase;

receiving, by the receiver of the communications device, a signal with a bandwidth wider than frequency domain physical resources occupied by the reduced number of the available sub-carriers of the connected phase by performing measurements on the received signal during one or more OFDM symbols; and processing the received signal in one or more other OFDM symbols subsequent to the one or more OFDM symbols during which the measurements are performed.

Paragraph 32. A method of operating an infrastructure equipment in a wireless communications network to transmit data to a communications device, the method comprising transmitting, by transmitter circuitry of the infrastructure equipment, downlink data during an initial access phase by the communications device for establishing a communications session via a wireless access interface provided by the wireless communications network, and transmitting, by transmitter circuitry of the infrastructure equipment, other downlink data during a connected phase of the communications session for the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the transmitting the downlink data during the initial access phase, comprises transmitting the downlink data using a reduced number of OFDM symbols per time slot or over a plurality of consecutive time slots and an increased number of the available sub-carriers per OFDM symbol compared to the other downlink data transmitted during the connected phase, or a reduced number of the available sub-carriers per OFDM symbol of the initial access phase and an increased or the same number of OFDM symbols per time slot or over a plurality of consecutive time slots compared to the transmission of the other downlink data during the connected phase, whereby a processing of the downlink data by the communications device can be with a maximum rate which is less than or equal to a maximum rate of processing the other downlink data received by the communications during the connected phase.

Paragraph 33. A method according to paragraph 32, wherein the transmitting the downlink data, during the initial access phase, comprises transmitting the downlink data from the same number of OFDM symbols per time slot and the same number of the available sub-carriers per OFDM symbol compared to the transmitting of the other downlink data during the connected phase, the downlink data being transmitted on the available sub-carriers which are displaced in frequency within the greater frequency domain physical resources of the initial access phase between consecutive OFDM symbols.

Paragraph 34. A method according to paragraph 32, wherein the transmitting the downlink data, during the initial access phase, comprises transmitting the downlink data from a reduced number of OFDM symbols over a plurality of consecutive time slots and an increased number of the available sub-carriers per OFDM symbol compared to the transmitting of the other downlink data during the connected phase, the downlink data being transmitted in a larger number of the OFDM symbols in a first of the plurality of consecutive time slots than the OFDM symbols in a second of the consecutive time slots.

Paragraph 35. A method according to paragraph 34, wherein the downlink data is transmitted in the first of the plurality of consecutive time slots and not in a second of the consecutive time slots.

Paragraph 36. A method according to paragraph 32, wherein the transmitting the downlink data, during the initial access phase, comprises transmitting the downlink data from a reduced number of OFDM symbols per time slot and an increased number of the available sub-carriers per OFDM symbol compared to the transmitting of the other downlink data during the connected phase, the downlink data being transmitted in the OFDM symbols in a first sub-slot of a time slot and not a second sub-slot of a time slot.

Paragraph 37. A method according to any of paragraphs 32 to 36, wherein the downlink data is system information.

Paragraph 38. A method according to any of paragraphs 32 to 37, comprising selecting to transmit the downlink data using a reduced number of OFDM symbols per time slot or over a plurality of consecutive time slots and an increased number of the available sub-carriers per OFDM symbol compared to the other downlink data transmitted during the connected phase, or a reduced number of the available sub-carriers per OFDM symbol of the initial access phase and an increased or the same number of OFDM symbols per time slot or over a plurality of consecutive time slots compared to the transmission of the other downlink data during the connected phase based on a BWP to be used to transmit the downlink data.

Paragraph 39. A method according to any of paragraphs 32 to 37, comprising selecting to transmit the downlink data using a reduced number of OFDM symbols per time slot or over a plurality of consecutive time slots and an increased number of the available sub-carriers per OFDM symbol compared to the other downlink data transmitted during the connected phase, or a reduced number of the available sub-carriers per OFDM symbol of the initial access phase and an increased or the same number of OFDM symbols per time slot or over a plurality of consecutive time slots compared to the transmission of the other downlink data during the connected phase based on a sub-carrier spacing of the OFDM symbols in the initial access phase.

Paragraph 40. A method according to any of paragraphs 32 to 37, comprising transmitting, using the transmitter circuitry in the infrastructure equipment, downlink data to another communications device in the initial access phase using OFDM symbols not used to transmit downlink data to the communications device.

Paragraph 41. A method of operating an infrastructure equipment in a wireless communications network to transmit data to a communications device, the method comprising transmitting, by transmitter circuitry of the infrastructure equipment, downlink data during an initial access phase of a communications session of the communications device from a wireless access interface provided by the wireless communications network, and transmitting, by transmitter circuitry of the infrastructure equipment, other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the connected phase having a greater number of sub-carriers available to carry the other downlink data within greater frequency domain physical resources than the OFDM symbols in the initial access phase in which the OFDM symbols have a smaller number of sub-carriers available to carry the downlink data within smaller frequency domain physical resources, wherein the transmitting the other downlink data during the connected phase, comprises transmitting the other downlink data using a reduced number of OFDM symbols per time slot or over a plurality of consecutive time slots and an increased number of the available sub-carriers per OFDM symbol compared to the receiving of the downlink data during the initial access phase, or a reduced number of the available sub-carriers per OFDM symbol of the connected phase and an increased or the same number of OFDM symbols per time slot or over a plurality of consecutive time slots compared to the receiving of the downlink data during the initial access phase, whereby a processing of the other downlink data by the communications device can be with a maximum rate which is less than or equal to a maximum rate of processing the downlink data received by the communications during the initial access phase.

Paragraph 42. A method according to paragraph 41, wherein the transmitting the other downlink data, during the connected phase, comprises transmitting the other downlink data from the same number of OFDM symbols per time slot and the same number of the available sub-carriers per OFDM symbol compared to the transmitting of the downlink data during the initial access phase, the other downlink data being transmitted on the available sub-carriers which are displaced in frequency within the greater frequency domain physical resources of the connected phase between consecutive OFDM symbols.

Paragraph 43. A method according to paragraph 41, wherein the transmitting the other downlink data, during the connected phase, comprises transmitting the other downlink data from a reduced number of OFDM symbols over a plurality of consecutive time slots and an increased number of the available sub-carriers per OFDM symbol compared to the transmitting of the downlink data during the initial access phase, the other downlink data being transmitted in a larger number of the OFDM symbols in a first of the plurality of consecutive time slots than the OFDM symbols in a second of the consecutive time slots.

Paragraph 44. A method according to paragraph 43, wherein the other downlink data is transmitted in the first of the plurality of consecutive time slots and not in a second of the consecutive time slots.

Paragraph 45. A method according to paragraph 41, wherein the transmitting the other downlink data, during the connected phase, comprises transmitting the other downlink data from a reduced number of OFDM symbols per time slot and an increased number of the available sub-carriers per OFDM symbol compared to the transmitting of the downlink data during the initial access phase, the other downlink data being transmitted in the OFDM symbols in a first sub-slot of a time slot and not a second sub-slot of a time slot.

Paragraph 46. A method according to any of paragraphs 41 to 45, comprising
- selecting to transmit the downlink data using a reduced number of OFDM symbols per time slot or over a plurality of consecutive time slots and an increased number of the available sub-carriers per OFDM symbol compared to the other downlink data transmitted during the connected phase, or
- a reduced number of the available sub-carriers per OFDM symbol of the initial access phase and an increased or the same number of OFDM symbols per time slot or over a plurality of consecutive time slots compared to the transmission of the other downlink data during the connected phase based on a sub-carrier spacing of the OFDM symbols in the initial access phase.

Paragraph 47. A method according to any of paragraphs 41 to 45, comprising
- transmitting, using the transmitter circuitry in the infrastructure equipment, downlink data to another communications device in the initial access phase using OFDM symbols not used to transmit downlink data to the communications device.

Paragraph 48. A communications device for receiving data from a wireless communications network, the communications device comprising
- transceiver circuitry configured to transmit and receive signals;
- control circuitry configured to control the transceiver circuitry to
- receive downlink data during an initial access phase of a communications session of the communications device from a wireless access interface provided by the wireless communications network, and
- receive other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the downlink data is received during the initial access phase from
- a reduced number of OFDM symbols per time slot or over a plurality of consecutive time slots and an increased number of the available sub-carriers per OFDM symbol compared to the receiving of the other downlink data during the connected phase, or
- a reduced number of the available sub-carriers per OFDM symbol of the initial access phase and an increased or the same number of OFDM symbols per time slot or over a plurality of consecutive time slots compared to the receiving of the other downlink data during the connected phase, and the downlink data is received during the initial access phase by
- processing the downlink data with a maximum rate of processing the downlink data which is less than or equal to a maximum rate of processing the other downlink data received during the connected phase.

Paragraph 49. A communications device for receiving data from a wireless communications network, the communications device comprising
- transceiver circuitry configured to transmit and receive signals;
- control circuitry configured to control the transceiver circuitry to
- receive downlink data during an initial access phase of a communications session of the communications device from a wireless access interface provided by the wireless communications network, and
- receive other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the connected phase having a greater number of sub-carriers available to carry the other downlink data within greater frequency domain physical resources than the OFDM symbols in the initial access phase in which the OFDM symbols have a smaller number of sub-carriers available to carry the downlink data within smaller frequency domain physical resources, wherein the other downlink data is received during the connected phase from
- a reduced number of OFDM symbols per time slot or over a plurality of consecutive time slots and an increased number of the available sub-carriers per OFDM symbol compared to the receiving of the downlink data during the initial access phase, or a reduced number of the available sub-carriers per OFDM symbol of the connected phase and an increased or the same number of OFDM symbols per time slot or over a plurality of consecutive time slots compared to the receiving of the downlink data during the initial access phase, and the other downlink data is received during the connected phase by processing the other downlink data with a maximum rate of processing the other downlink data which is less than or equal to a maximum rate of processing the downlink data received during the initial access phase.

Paragraph 50. An infrastructure equipment configured to operate in a wireless communications network to transmit data to a communications device, the infrastructure equipment comprising transceiver circuitry configured to transmit and receive signals;

control circuitry configured to control the transceiver circuitry to transmit downlink data during an initial access phase by the communications device for establishing a communications session via a wireless access interface provided by the wireless communications network, and transmit other downlink data during a connected phase of the communications session for the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the downlink data is transmitted during the initial access phase using a reduced number of OFDM symbols per time slot or over a plurality of consecutive time slots and an increased number of the available sub-carriers per OFDM symbol compared to the other downlink data transmitted during the connected phase, or a reduced number of the available sub-carriers per OFDM symbol of the initial access phase and an increased or the same number of OFDM symbols per time slot or over a plurality of consecutive time slots compared to the transmission of the other downlink data during the connected phase, whereby a processing of the downlink data by the communications device can be with a maximum rate which is less than or equal to a maximum rate of processing the other downlink data received by the communications during the connected phase.

Paragraph 51. An infrastructure equipment configured to operate in a wireless communications network to transmit data to a communications device, the infrastructure equipment comprising transceiver circuitry configured to transmit and receive signals;

control circuitry configured to control the transceiver circuitry to transmit downlink data during an initial access phase of a communications session of the communications device from a wireless access interface provided by the wireless communications network, and transmit other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the connected phase having a greater number of sub-carriers available to carry the other downlink data within greater frequency domain physical resources than the OFDM symbols in the initial access phase in which the OFDM symbols have a smaller number of sub-carriers available to carry the downlink data within smaller frequency domain physical resources, wherein the other downlink data is transmitted during the connected phase using a reduced number of OFDM symbols per time slot or over a plurality of consecutive time slots and an increased number of the available sub-carriers per OFDM symbol compared to the receiving of the downlink data during the initial access phase, or a reduced number of the available sub-carriers per OFDM symbol of the connected phase and an increased or the same number of OFDM symbols per time slot or over a plurality of consecutive time slots compared to the receiving of the downlink data during the initial access phase, whereby a processing of the other downlink data by the communications device can be with a maximum rate which is less than or equal to a maximum rate of processing the downlink data received by the communications during the initial access phase.

Paragraph 52. A communications device including transceiver circuitry and control circuitry including a processor for executing computer executable code, and when the computer executable code is executed the processor performs the method according to paragraph 1.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-193238. "New SID on support of reduced capability NR devices". Ericsson. RAN plenary #86. December 2019.

[2] Holma H. and Toskala A, "LTE for UMTS OFDMA and SC-FDMA based radio access", John Wiley and Sons, 2009

[3] Chairman's notes. RAN1#101e. May-June 2020.

What is claimed is:

1. A method of receiving data at a communications device from a wireless communications network, the method comprising receiving, by a receiver of the communications device, downlink data during an initial access phase of a communications session of the communications device from a wireless access interface provided by the wireless communications network, and receiving, by the receiver of the communications device, other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the receiving the downlink data during the initial access phase, comprises receiving the downlink data from a reduced number of OFDM symbols per time slot or over a plurality of consecutive time slots and an increased number of the available sub-carriers per OFDM symbol compared to the receiving of the other downlink data during the connected phase, or a reduced number of the available sub-carriers per OFDM symbol of the initial access phase and an increased or the same number of OFDM symbols per time slot or over a plurality of consecutive time slots compared to the receiving of the other downlink data during the connected phase, and the receiving, by the receiver of the communications device, the downlink data during the initial access phase includes processing the downlink data with a maximum rate of processing the downlink data which is less than or equal to a maximum rate of processing the other downlink data received during the connected phase.

2. A method according to claim 1, wherein the receiving the downlink data, during the initial access phase, comprises receiving the downlink data from the same number of OFDM symbols per time slot and the same number of the available sub-carriers per OFDM symbol compared to the receiving of the other downlink data during the connected phase, the downlink data being received on the available sub-carriers which are displaced in frequency within the greater frequency domain physical resources of the initial access phase between consecutive OFDM symbols.

3. A method according to claim 1, wherein the receiving the downlink data, during the initial access phase, comprises receiving the downlink data from a reduced number of OFDM symbols over a plurality of consecutive time slots and an increased number of the available sub-carriers per OFDM symbol compared to the receiving of the other downlink data during the connected phase, the downlink data being received in a larger number of the OFDM symbols in a first of the plurality of consecutive time slots than the OFDM symbols in a second of the consecutive time slots.

4. A method according to claim 3, wherein the downlink data is received in the first of the plurality of consecutive time slots and not in a second of the consecutive time slots.

5. A method according to claim 1, wherein the receiving the downlink data, during the initial access phase, comprises receiving the downlink data from a reduced number of OFDM symbols per time slot and an increased number of the available sub-carriers per OFDM symbol compared to the receiving of the other downlink data during the connected phase, the downlink data being received in the OFDM symbols in a first sub-slot of a time slot and not a second sub-slot of a time slot.

6. A method according to claim 1, wherein the downlink data is system information.

7. A method according to claim 6, wherein the system information is received as a plurality of system information blocks, SIBs, and the receiving, by the receiver of the communications device, the downlink data during the initial access phase of the communications session comprises receiving a second of the plurality of SIBs after a time gap from receiving a first of the plurality of SIBs.

8. A method according to claim 7, wherein the time gap is at least one time slot.

9. A method according to claim 6, wherein the system information is received as one or more system information block, SIB, messages, at least one of the SIB messages being transmitted repeatedly at a first time instant in a first and a second transport block transmitted in first and second downlink physical resources and at a second time instant in a third and a fourth transport block transmitted in third and fourth downlink physical resources, and the receiving, by the receiver of the communications device, the downlink data during the initial access phase of the communications session comprises receiving the SIB message from one of the first and the second transport blocks at the first time instant and one of the third and fourth transport blocks at the second time instant, the receiving the SIB message being with a time gap between either the first transport block, and the third or fourth transport blocks or between the second transport block and the third or fourth transport blocks, and the SIB message being received with the reduced number of OFDM symbols per time slot or over a plurality of consecutive time slots and an increased number of the available sub-carriers per OFDM symbol compared to the receiving of the other downlink data during the connected phase.

10. A method according to claim 9, wherein the SIB message is transmitted at the first time instant and the second time instant with a same segmentation and packetisation.

11. A method according to claim 6, wherein the system information is received as one or more system information block, SIB, messages, at least one of the SIB messages being transmitted as a plurality of parts, a first part of the SIB message being transmitted repeatedly in first and second transport blocks in adjacent time slots or adjacent sub-slots, and a second part of the SIB message being transmitted repeatedly in third and fourth transport blocks in adjacent time slots time slots or adjacent sub-slots, and the receiving, by the receiver of the communications device, the downlink data during the initial access phase of the communications session comprises receiving the first part of the SIB message from one of the first and the second transport blocks, and receiving the second part of the SIB message from one of the third and the fourth transport blocks, the receiving the second part of the SIB message being with a time gap from receiving the first part of the SIB message by receiving either the first transport block or the second transport block and the third transport block or the fourth transport blocks.

12. A method according to claim 6, wherein the system information is transmitted as one or more transport blocks of a SIB message, where each transport block is encoded with an error correction encoder and transmitted in a plurality of physical resource blocks with an encoding rate of the error correction encoding which is matched to a number of the plurality of physical resource blocks on which the transport block of the SIB message is transmitted, and the receiving, by the receiver of the communications device, the downlink data during the initial access phase of the communications session comprises receiving one or more of the physical resource blocks on which the SIB message is transmitted, a number of the received physical resource blocks being less than the number of the plurality of physical resource blocks on which the transport block of the SIB message was transmitted, and decoding, using an error correction decoder the transport block of the SIB message from the number of the received physical resource blocks, the encoding rate being sufficient to recover the transport block of the SIB message from number of the received physical resource blocks, the number of physical resource blocks transmitted being larger compared to the number transmitted for the other downlink data during the connected phase.

13. A method according to claim 1, comprising selecting, a Physical Random Access Channel, PRACH, preamble from a plurality of PRACH partitions, each PRACH partition comprising a plurality of PRACH preambles and either receiving, by the receiver in the communications device, a plurality of subsequent downlink messages in the initial access phase such that a time gap between each transmission is at least one time slot in length or receiving the plurality of subsequent downlink messages in the initial access phase on the reduced number of the available sub-carriers per OFDM symbol of the initial access phase and an increased or the same number of OFDM symbols per time slot or over a plurality of consecutive time slots compared to the receiving of the other downlink data during the connected phase.

14. A method according to claim 1, comprising determining, by the communications device, based on the maximum rate of processing the other downlink data received during the connected phase that it cannot receive the downlink data in the initial access phase from the greater number of sub-carriers available to carry the downlink data within the greater frequency domain physical resources than the OFDM symbols in the connected phase in which the OFDM symbols have the smaller number of sub-carriers available to carry the other downlink data within the smaller frequency domain physical resources, transmitting, by transmitter circuitry in the communications device, an indication that the communications device cannot receive the downlink data in the initial access phase from the greater number of available sub-carriers to carry the downlink data within the greater frequency domain physical resources, the indication being transmitted in Message 3, Msg 3, of a random access channel (RACH) procedure used by the UE to establish the communication session, the downlink data being subsequently received during the initial access phase from the reduced number of OFDM symbols per time slot or over a plurality of consecutive time slots and the increased number of the available sub-carriers per OFDM symbol compared to the receiving of the other downlink data during the connected phase, or the increased or the same number of OFDM symbols per time slot and the reduced number of the available sub-carriers per OFDM symbol compared to the receiving of the other downlink data during the connected phase.

15. A communications device for receiving data from a wireless communications network, the communications device comprising transceiver circuitry configured to transmit and receive signals;

control circuitry configured to control the transceiver circuitry to receive downlink data during an initial access phase of a communications session of the communications device from a wireless access interface provided by the wireless communications network, and receive other downlink data during a connected phase of the communications session of the communications device transmitted to the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the downlink data is received during the initial access phase from a reduced number of OFDM symbols per time slot or over a plurality of consecutive time slots and an increased number of the available sub-carriers per OFDM symbol compared to the receiving of the other downlink data during the connected phase, or a reduced number of the available sub-carriers per OFDM symbol of the initial access phase and an increased or the same number of OFDM symbols per time slot or over a plurality of consecutive time slots compared to the receiving of the other downlink data during the connected phase, and the downlink data is received during the initial access phase by processing the downlink data with a maximum rate of processing the downlink data which is less than or equal to a maximum rate of processing the other downlink data received during the connected phase.

16. An infrastructure equipment configured to operate in a wireless communications network to transmit data to a communications device, the infrastructure equipment comprising transceiver circuitry configured to transmit and receive signals;

control circuitry configured to control the transceiver circuitry to transmit downlink data during an initial access phase by the communications device for establishing a communications session via a wireless access interface provided by the wireless communications network, and transmit other downlink data during a connected phase of the communications session for the communications device via the wireless access interface, the wireless access interface providing communications resources comprising a predetermined number of OFDM symbols in each of a plurality of time slots, the OFDM symbols in the initial access phase having a greater number of sub-carriers available to carry the downlink data within greater frequency domain physical resources than the OFDM symbols in the connected phase in which the OFDM symbols have a smaller number of sub-carriers available to carry the other downlink data within smaller frequency domain physical resources, wherein the downlink data is transmitted during the initial access phase using a reduced number of OFDM symbols per time slot or over a plurality of consecutive time slots and an increased number of the available sub-carriers per OFDM symbol compared to the other downlink data transmitted during the connected phase, or a reduced number of the available sub-carriers per OFDM symbol of the initial access phase and an increased or the same number of OFDM symbols per time slot or over a plurality of consecutive time slots compared to the transmission of the other downlink data during the connected phase, whereby a processing of the downlink data by the communications device can be with a maximum rate which is less than or equal to a maximum rate of processing the other downlink data received by the communications during the connected phase.

* * * * *